US012703568B2

(12) United States Patent
Whittemore et al.

(10) Patent No.: US 12,703,568 B2
(45) Date of Patent: Aug. 11, 2026

(54) SYSTEM, APPARATUS AND METHOD FOR HI-EFFICIENCY LOGISTIC TOWERS

(71) Applicant: URBX INC., Boston, MA (US)

(72) Inventors: Kirk Whittemore, Montgomery, OH (US); Nikko Pianetto, Tampa, FL (US); Lincoln Cavalieri, Lynnfield, MA (US); Adam Looker, Gananoque (CA)

(73) Assignee: URBX, Inc., Boston, MA (US)

( * ) Notice: Subject to any disclaimer, the term of this patent is extended or adjusted under 35 U.S.C. 154(b) by 253 days.

(21) Appl. No.: 18/460,446

(22) Filed: Sep. 1, 2023

(65) Prior Publication Data

US 2024/0246762 A1 Jul. 25, 2024

Related U.S. Application Data

(60) Provisional application No. 63/515,156, filed on Jul. 24, 2023, provisional application No. 63/496,393, (Continued)

(51) Int. Cl.
*B65G 1/04* (2006.01)
*B65G 1/137* (2006.01)

(52) U.S. Cl.
CPC ......... *B65G 1/0464* (2013.01); *B65G 1/1371* (2013.01)

(58) Field of Classification Search
None
See application file for complete search history.

(56) References Cited

U.S. PATENT DOCUMENTS 5,163,360 A 11/1992 Petz
5,379,229 A 1/1995 Parsons
(Continued)

FOREIGN PATENT DOCUMENTS

CN 1248954 3/2000
CN 1320419 A 11/2001
(Continued)

OTHER PUBLICATIONS

International Search Report and Written Opinion of PCT/CN2019/123202, Mailed Mar. 4, 2020.
(Continued)

*Primary Examiner* — Mark C Hageman
(74) *Attorney, Agent, or Firm* — Build IP, LLC; Robert V. Donahoe

(57) ABSTRACT

A storage system includes a three dimensional structure including an array of cells including a plurality of cells configured to retain individual storage bins for retrieval, the array of cells forming a plurality of storage levels located at different elevations within the three dimensional structure, respectively. A second plurality of cells positioned relative to one another to form a plurality of vertical shafts located within the three dimensional structure. The storage system includes a plurality of towerbots located atop the three dimensional structure. Each of the towerbots is configured to move laterally atop the three dimensional structure between multiple different locations atop the three dimensional structure including at least a first position located above a first vertical shaft included in the plurality of vertical shafts and a second position located above a second vertical shaft included in the plurality of vertical shafts.

18 Claims, 13 Drawing Sheets

Related U.S. Application Data filed on Apr. 15, 2023, provisional application No. 63/487,539, filed on Feb. 28, 2023, provisional application No. 63/480,964, filed on Jan. 21, 2023.

(56) References Cited

U.S. PATENT DOCUMENTS

| | | | | |
|---|---|---|---|---|
| 8,628,289 | B1 | 1/2014 | Benedict | |
| 10,351,261 | B1 | 7/2019 | Bryant | |
| 10,501,205 | B1 | 12/2019 | Siewert | |
| 11,008,165 | B2 * | 5/2021 | Gravelle | B65G 1/0478 |
| 11,814,170 | B2 | 11/2023 | Fernandez | |
| 11,993,396 | B2 | 5/2024 | Ragan | |
| 12,378,069 | B2 * | 8/2025 | Austrheim | B65G 1/045 |
| 2004/0069572 | A1 | 4/2004 | Jaspers | |
| 2006/0239801 | A1 | 10/2006 | Gudehus | |
| 2007/0065258 | A1 | 3/2007 | Benedict | |
| 2010/0189534 | A1 | 7/2010 | Jung | |
| 2015/0225187 | A1 | 8/2015 | Razumov | |
| 2015/0291356 | A1 | 10/2015 | Oki | |
| 2017/0113800 | A1 | 4/2017 | Freeman | |
| 2017/0175413 | A1 | 6/2017 | Curlander | |
| 2017/0313421 | A1 | 11/2017 | Gil | |
| 2018/0035625 | A1 | 2/2018 | Lindbo | |
| 2018/0086573 | A1 | 3/2018 | Lindbo | |
| 2018/0330313 | A1 | 11/2018 | Clarke | |
| 2018/0352988 | A1 | 12/2018 | Ortiz | |
| 2020/0087065 | A1 | 3/2020 | Gravelle | |
| 2020/0216298 | A1 | 7/2020 | Gravelle | |
| 2021/0371203 | A1 * | 12/2021 | O'Brien | B65G 47/904 |
| 2022/0194699 | A1 * | 6/2022 | Looker | B65G 1/045 |
| 2022/0291700 | A1 | 9/2022 | Farley | |
| 2023/0150766 | A1 * | 5/2023 | Fagerland | B65G 1/045 700/218 |
| 2024/0017920 | A1 * | 1/2024 | Stokowski | B66C 17/06 |
| 2024/0092573 | A1 | 3/2024 | Hognaland | |
| 2024/0286833 | A1 * | 8/2024 | Heggebø | B65G 1/10 |

FOREIGN PATENT DOCUMENTS

| | | | | | |
|---|---|---|---|---|---|
| CN | 101151198 | A | | 3/2008 | |
| CN | 107397663 | A | | 11/2017 | |
| CN | 108430890 | A | | 8/2018 | |
| CN | 108473252 | A | | 8/2018 | |
| CN | 110937294 | A | | 3/2020 | |
| DE | 2050686 | A1 | | 4/1972 | |
| DE | 3038474 | | | 5/1982 | |
| DE | 102014112480 | A1 | | 3/2016 | |
| DE | 102015118535 | | | 5/2017 | |
| JP | S5138158 | | | 9/1976 | |
| JP | 2008534406 | | | 8/2008 | |
| JP | 2015535517 | | | 12/2015 | |
| WO | 2005030618 | A1 | | 4/2005 | |
| WO | 2020030919 | A1 | | 2/2020 | |
| WO | WO2020210558 | | * | 10/2020 | B65G 1/04 |
| WO | WO-2021198036 | A1 | * | 10/2021 | E04H 6/18 |
| WO | 2022212859 | A1 | | 10/2022 | |
| WO | 2022253778 | A1 | | 12/2022 | |
| WO | WO-2028248451 | A1 | * | 12/2022 | B65G 1/04 |

OTHER PUBLICATIONS

Written Opinion, dated Sep. 1, 2022, for International Application No. PCT/US2022/023073.

International Search Report and Written Opinion, dated Jun. 12, 2024, for corresponding International Application No. PCT/US20242/017405.

* cited by examiner

SYSTEM, APPARATUS AND METHOD FOR HI-EFFICIENCY LOGISTIC TOWERS

BACKGROUND OF INVENTION

1. Field of Invention

This invention relates generally to logistic tower-based storage systems. More specifically, at least one embodiment relates to a system, apparatus and method for hi-efficiency logistic tower-based storage systems.

2. Discussion of Related Art

Today, a wide variety of approaches for automation are employed in material handling logistics hubs such as distribution centers, fulfillment centers and micro-fulfillment centers. Some known approaches employ three dimensional grid structures arranged in cells through which retrieval vehicles operate to access storage units for the storage and retrieval of material located in bins throughout the structure. In many cases, the cells are organized such that a vertical column in the structure is located for operation of a retrieval vehicle that can access storage containers in one or more bays (or storage cells) positioned around the retrieval column horizontally at each level. The three dimensional grid structure may include multiple vertical retrieval columns with associated bays accessible around each retrieval column, respectively, at each of the separate levels of the structure. In general, a grid position including a vertical retrieval column in combination with the adjacent storage cells that are accessed via the retrieval column form a set of cells in the grid. For example, FIGS. 1A and 1B illustrate a top view of two different sets of cells 19, 29, respectively, employed in prior grid structures for material storage. Each of the sets of cells includes an elevator cell 17 and a plurality of storage cells 21. In FIG. 1A, the set of cells 19 includes a total of three storage cells 21 with one storage cell located on three of the four sides of the elevator cell 17. In FIG. 1B, the set of cells 29 includes a total of four storage cells 21 with one storage cell located on each of the four sides of the elevator cell 17. In these prior art approaches, the set of cells 19, 29 includes adjacent storage cells that are a single cell deep. That is, the elevator cell 17 provides access to a single cell located on each of three or four sides of the elevator cell 17, respectively. According to these approaches, multiple sets of these single-deep sets of cells 19, 29 are combined to form the grid of cells located at the various levels of a vertical storage structure.

The multi-level high-density nature of these vertical storage structures increases the amount of material that can be stored on a piece of property having a given area or square footage (the “footprint”). But while these structures increase the storage efficiency or storage density for a given geographic footprint, inefficiencies remain. For example, FIG. 2 provides a top view of a completed level of a conventional vertical storage structure 11 designed with the sets of cells 19, 29 illustrated in FIGS. 1A and 1B, respectively. As viewed from above, the storage grid has dimensions of seventeen grids by eighteen grids. This includes elevator cells 17, storage cells 21 and unoccupied cells 23. Each associated sets of cells 19, 29 is identified by the horizontal and vertical lines that illustrate the horizontal travel path (or range) of the retrieval device, for example, grid robots at each level. For example, the sets of cells 19 include the elevator shaft 17 and the three single-deep storage cells 21 arranged on three sides of the elevator shaft 17. The sets of cells 29 include the elevator shaft 17 and the four single-deep storage cells 21 arranged on the four sides of the elevator shaft 17.

While FIG. 2 illustrates a single level in a multi-level storage array, the same layout is found at each storage level. This compounds the inefficiencies by adding more unoccupied spaces for each level included in the storage array. For example, the 17 by 18 cell array created with single-deep storage cells illustrated in FIG. 2 includes fourteen unoccupied spaces. A ten level storage array constructed in this fashion includes 140 unoccupied cells.

So, even though the goal of these vertical storage structures is a compact high density footprint, the unused, unoccupied cells 23 still result due to the geometry available when assembling a storage grid 11 using the sets of cells 19, 29 as the building blocks of the overall array of cells. In addition, the geometry provided by the sets of cells 19, 29 limits the quantity of storage cells that can be accessed by a single retrieval device to a maximum of four. As a result, the use of the conventional single-deep set of cells 19, 29 in the storage grid increases the quantity of retrieval devices that are required in an array of any given size.

In general, conventional vertical storage structures include a lower level that is traversed by wheeled robot carts. These carts operate to transfer material to and from a retrieval device at the bottom of the elevator shafts. They also shuttle material between the elevator shafts and the material drop off locations and the material pickup locations available at the vertical storage structure. These carts require a set of tracks or rails on which to operate. In addition, operation of the carts must be precisely controlled using complex software logic to avoid collisions and/or delays created with multiple carts are on the same track or in the same vicinity.

While the speed at which material moves through the logistics hub is important the above-described deficiencies cannot be avoided with these conventional approaches.

SUMMARY OF INVENTION

Therefore, there is a need for approaches to increase the storage density of grid-based, material handling logistics hubs. According to some embodiments, storage density is increased with a geometry of a set-of-cells employed as a building block including multiple double deep sets of storage cells in a selected configuration.

There is also a need to provide designs that increase the operational efficiency of grid-based, material handling logistics towers. According to some embodiments, grid-based material handling logistics towers achieve significant improvements in operational efficiency by including a winch-based elevator systems in combination with a dynamic conveyor system located beneath a multi-level array of storage cells to pickup locations. Some of these embodiments eliminate the need for robotic flatbed carts to shuttle material beneath the array of storage cells. The elimination of robotic carts can significantly increase the operational speed of material transfer within material handling logistics tower. Applicant finds that in various embodiments the combination of winch-based elevators and conveyor systems deployed with arrays of storage cells that use three-bay double deep storage cells can optimize the overall system speed for material handling storage and pickup.

According to one aspect, a storage system includes a three dimensional structure including an array of cells including a first plurality of cells configured to retain individual storage bins for retrieval, the array of cells forming a plurality of storage levels located at different elevations within the three dimensional structure, respectively, and a second plurality of cells positioned relative to one another to form a plurality of vertical shafts located within the three dimensional structure. The plurality of vertical shafts are configured to permit access to storage cells included in the first plurality of cells at each of the plurality of storage levels. The storage system also includes a material transfer level located beneath the plurality of storage levels. The material transfer level includes a transportation system configured to move the individual storage bins: a) from drop-off stations to locations beneath the plurality of vertical shafts; and b) from the locations beneath the plurality of vertical shafts to pickup stations. The storage system also includes a plurality of towerbots located atop the three dimensional structure. Each of the plurality of towerbots includes a vertical lift system including a bin handler. The plurality of towerbots are configured to move the bin handler vertically within the plurality of vertical shafts to align the bin handler with the first plurality of cells at the different elevations. Each of the towerbots is configured to move laterally atop the three dimensional structure between multiple different locations atop the three dimensional structure including at least a first position located above a first vertical shaft included in the plurality of vertical shafts and a second position located above a second vertical shaft included in the plurality of vertical shafts.

According to some embodiments, with the towerbot located at the first position, the vertical lift system is configured to position the bin handler in the first vertical shaft adjacent a first set of storage cells at a selected elevation included in the different elevations. The first set of storage cells includes at least one inner cell configured to retain an individual storage bin for later retrieval. The at least one inner cell includes a first side located immediately adjacent an elevator cell in which the bin handler is positioned at the selected elevation, and a second side located opposite the first side. With the bin handler positioned adjacent the first set of storage cells, the bin handler is configured to retrieve a first storage bin located in the at least one inner cell for a vertical transport from the selected elevation to the material transfer level for a release of the first storage bin by the bin handler to the transportation system to allow the first storage bin to move from a location beneath the first vertical shaft. The towerbot is configured to move atop the three dimensional structure from the first position to the second position to access the second vertical shaft to retrieve a second storage bin and deliver the second storage bin to the transportation system.

According to some embodiments, each of the plurality of towerbots, respectively, is configured to raise and lower an associated bin handler between a fully raised position and a fully lowered position. Each of the plurality of towerbots, respectively, includes a plurality of wheels configured to engage the three dimensional structure and propel the respective towerbot between the multiple different locations atop the three dimensional structure. Further, with the associated bin handler in the fully raised position and a storage bin securely gripped by the associated bin handler a lower portion of the storage bin extends beneath the plurality of wheels of the respective towerbot.

According to some further embodiments, the set of storage cells includes at least one set of double deep storage cells including the at least one inner cell and an outer cell. The outer cell included in the at least one set of double deep storage cells is located adjacent the second side of the at least one inner cell. With the bin handler positioned adjacent the set of storage cells, the bin handler is configured to retrieve a storage bin located in the outer cell for the vertical transport from the from the selected elevation to the material transfer level. The at least one inner cell is one of a plurality of inner cells included in the set of storage cells and the outer cell is one of a plurality of outer cells included in the set of storage cells. The set of storage cells includes a plurality of sets of double deep storage cells, respectively, each including: a) one of the plurality of inner cells, respectively, each having a respective first side located immediately adjacent the elevator cell in which the bin handler is positioned at the selected elevation and a respective second side located opposite the respective first side; and b) one of the plurality of outer cells, respectively, each located adjacent the respective second side of the respective inner cell included in the respective set of double deep storage cells.

According to another aspect a method of material storage and retrieval is provided. According to these embodiments, the plurality of storage cells are arranged together at different elevations within a three dimensional structure. The plurality of storage cells are configured to retain individual storage bins for retrieval. The plurality of elevator cells are positioned relative to one another to form a plurality of vertical shafts located within the three dimensional structure. The plurality of vertical shafts are configured to permit access to storage cells included in the plurality of storage cells at each of the different elevations. A material transfer level is located beneath the plurality of storage cells and the plurality of elevator cells. The material transfer level includes a transportation system configured to move the individual storage bins: a) from drop-off stations to locations beneath the plurality of vertical shafts; and b) from the locations beneath the plurality of vertical shafts to pickup stations, for storage and retrieval of material within the individual storage bins. A plurality of towerbots are located atop the three dimensional structure, each of the plurality of towerbots includes a vertical lift system including a bin handler. The plurality of towerbots are configured to move the bin handler vertically within the plurality of vertical shafts to align the bin handler with the plurality of storage cells at the different elevations.

According to these embodiments, each of the towerbots is configured to move laterally atop the three dimensional structure between multiple different locations atop the three dimensional structure including at least a first position located above a first vertical shaft included in the plurality of vertical shafts and a second position located above a second vertical shaft included in the plurality of vertical shafts. The vertical lift system is configured to position the bin handler in the first vertical shaft adjacent a first set of storage cells at a selected elevation included in the different elevations, such that with the bin handler positioned adjacent the first set of storage cells, the bin handler is positioned to retrieve a first storage bin located in the first set of storage cells for a vertical transport from the selected elevation to the material transfer level for a release of the first storage bin by the bin handler to the transportation system to allow the first storage bin to move from a location beneath the first vertical shaft. The towerbot is configured to move atop the three dimensional structure from the first position to the second position to access the second vertical shaft to retrieve a second storage bin and deliver the second storage bin to the transportation system.

According to a further embodiment, a conveyor system is included in the transportation system, the conveyor system including a plurality of motorized conveyor tiles. According to another embodiment, the transportation system includes a shuttle system configured to move the individual storage bins on the material transfer level. The shuttle system includes a plurality of shuttles configured to traverse the horizontal shuttle grid to receive the individual storage bins from the bin handler.

According to still another aspect, a towerbot is employed with a storage array including a plurality of elevator shafts located above a transportation system. According to some embodiments, the tower bot includes a frame, a lift system secured to the frame, a bin handler assembly coupled to the vertical lift system. The bin handler assembly includes a trolley and a bin handler coupled to the bin handler assembly beneath the trolley, a set of wheels extending beneath the frame and a drive system configured to rotate the set of wheels to move the towerbot from a first position above a first elevator shaft included in the plurality of elevator shafts to a second position above a second elevator shaft included in the plurality of elevator shafts, the first elevator shaft being a different elevator shaft than the second elevator shaft.

According to some embodiments, the lift system is configured to move the bin handler assembly vertically within the first elevator shaft to align the bin handler with a first set of storage cells located adjacent the first elevator shaft. The bin handler is positioned adjacent the first set of storage cells, the bin handler is configured to operate to retrieve a first storage bin and move the first storage bin vertically within the first elevator shaft, to lower the first storage bin to the transportation system and release the first storage bin to the transportation system for a horizontal transport. According to these embodiments, the towerbot is configured to move atop the storage array from the first position to the second position and then to move the bin handler assembly vertically within the second elevator shaft to align the bin handler with a second set of storage cells located adjacent the second elevator shaft to retrieve a second storage bin and deliver the second storage bin to the transportation system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
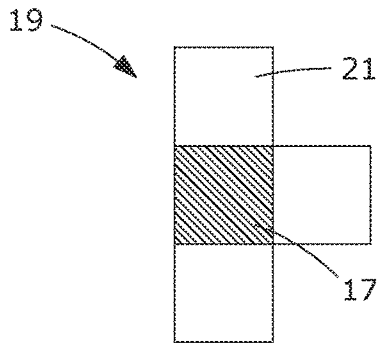
FIGS. 1A and 1B illustrate sets of cells for use in a material handling storage grid in accordance with a conventional approach.
Figure 1B:
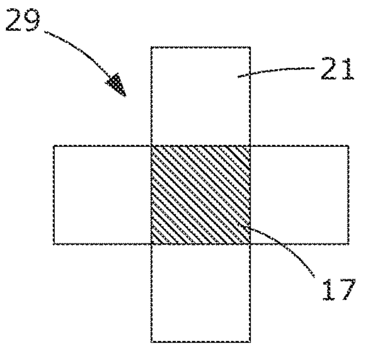
Figure 2:
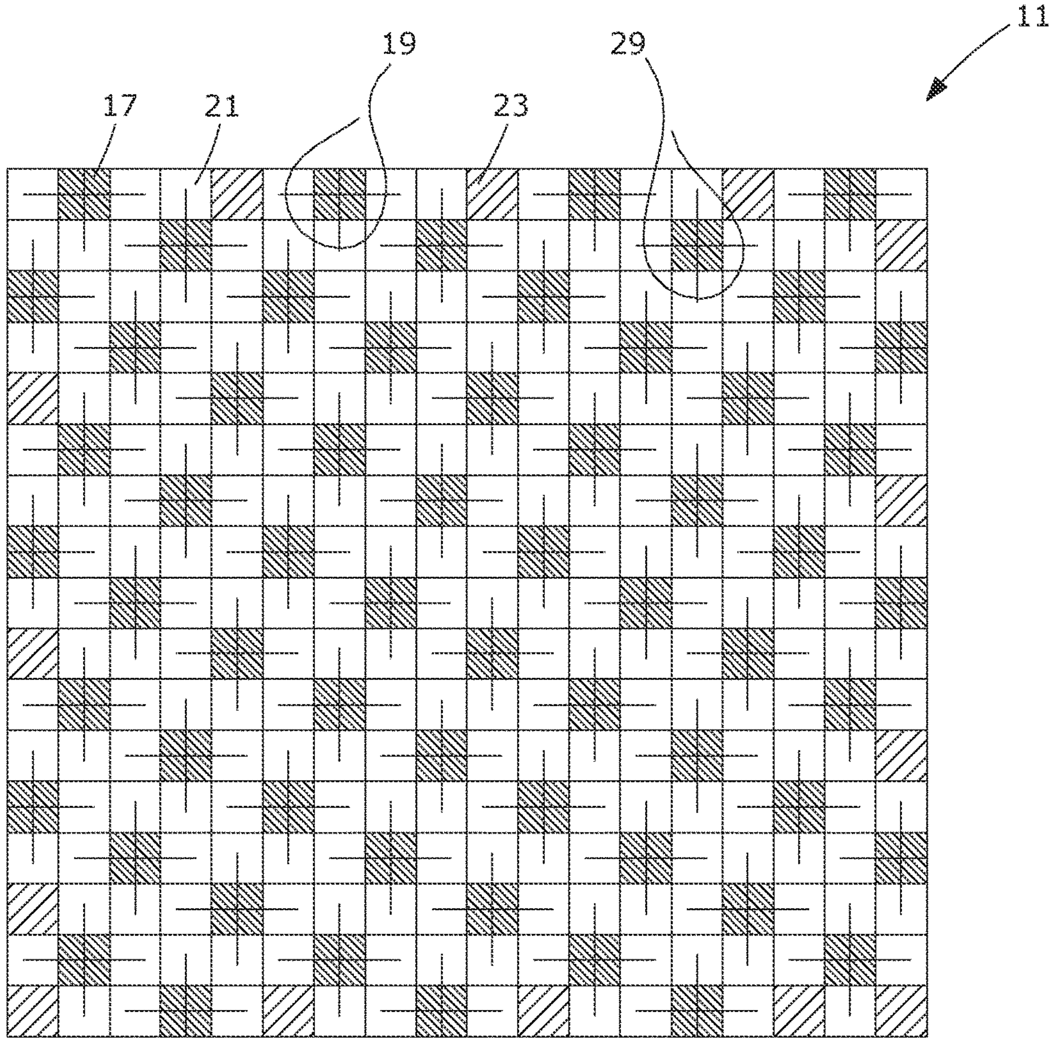
FIG. 2 illustrates a top view of a material handling storage grid in accordance with a conventional approach.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 3A:
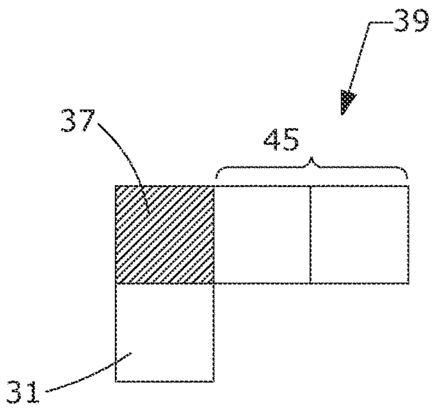
FIGS. 3A and 3B illustrate sets of cells for use in a material handling storage grid for a logistics hub in accordance with one embodiment.

Referring to FIG. 3A a top view of a first set of cells 39 for use in a material handling storage grid for a logistics hub is illustrated in accordance with some embodiments. The first set of cells 39 includes an elevator cell 37 and a plurality of storage cells 31. In the illustrated embodiment, the first set of cells 39 includes a single storage cell located adjacent a first side of the elevator cell 37 and a double deep pair of storage cells 45 located adjacent a second side of the elevator cell 37. In this configuration, each cell has a parallelogram shape when viewed from above and the first side and the second side of the elevator cell 37 are located adjacent but orthogonal to one another. This provides the first set of cells 39 with an overall L-shape when viewed from above.

Figure 3B:
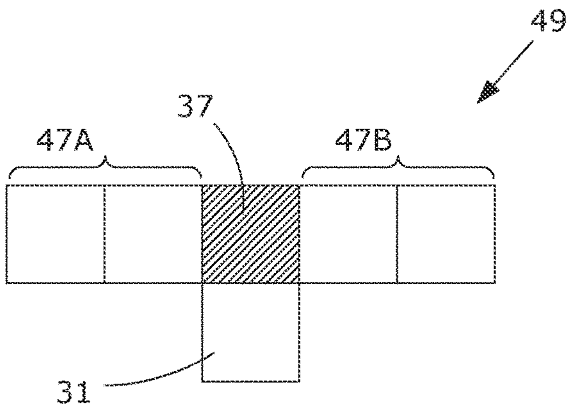

Referring to FIG. 3B, a top view of a second set of cells 49 for use in a material handling storage grid for a logistics hub is illustrated in accordance with some embodiments. The second set of cells 49 includes an elevator cell 37 and a plurality of storage cells 31. In the illustrated embodiment, the second set of cells 49 includes a single storage cell 31 located adjacent a first side of the elevator cell 37, a first double deep pair of storage cells 47A located adjacent a second side of the elevator cell 37 and a second double deep pair of storage cells 47B located adjacent a third side of the elevator cell 37. In this configuration, each cell has a parallelogram shape when viewed from above. The first side and the second side of the elevator cell 37 are located adjacent but orthogonal to one another. The third side of the elevator cell 37 is located adjacent and orthogonal to the first side and opposite the second side. In this embodiment, the second set of cells 49 has an overall T-shape when viewed from above with the single storage cell 31A, oriented at a 90 degree angle to each of the first double deep pair of storage cells 47A and the second double deep pair of storage cells 47B.

The set of cells 49 illustrated in FIG. 3B is referred to as a three-bay double-deep configuration because it includes at least one storage cell on three of the four sides of the elevator cell 37 and includes at least one pair of double deep storage cells. In the illustrated embodiment, the set of cells 49 includes two pairs of double deep storage cells.

Figure 4:
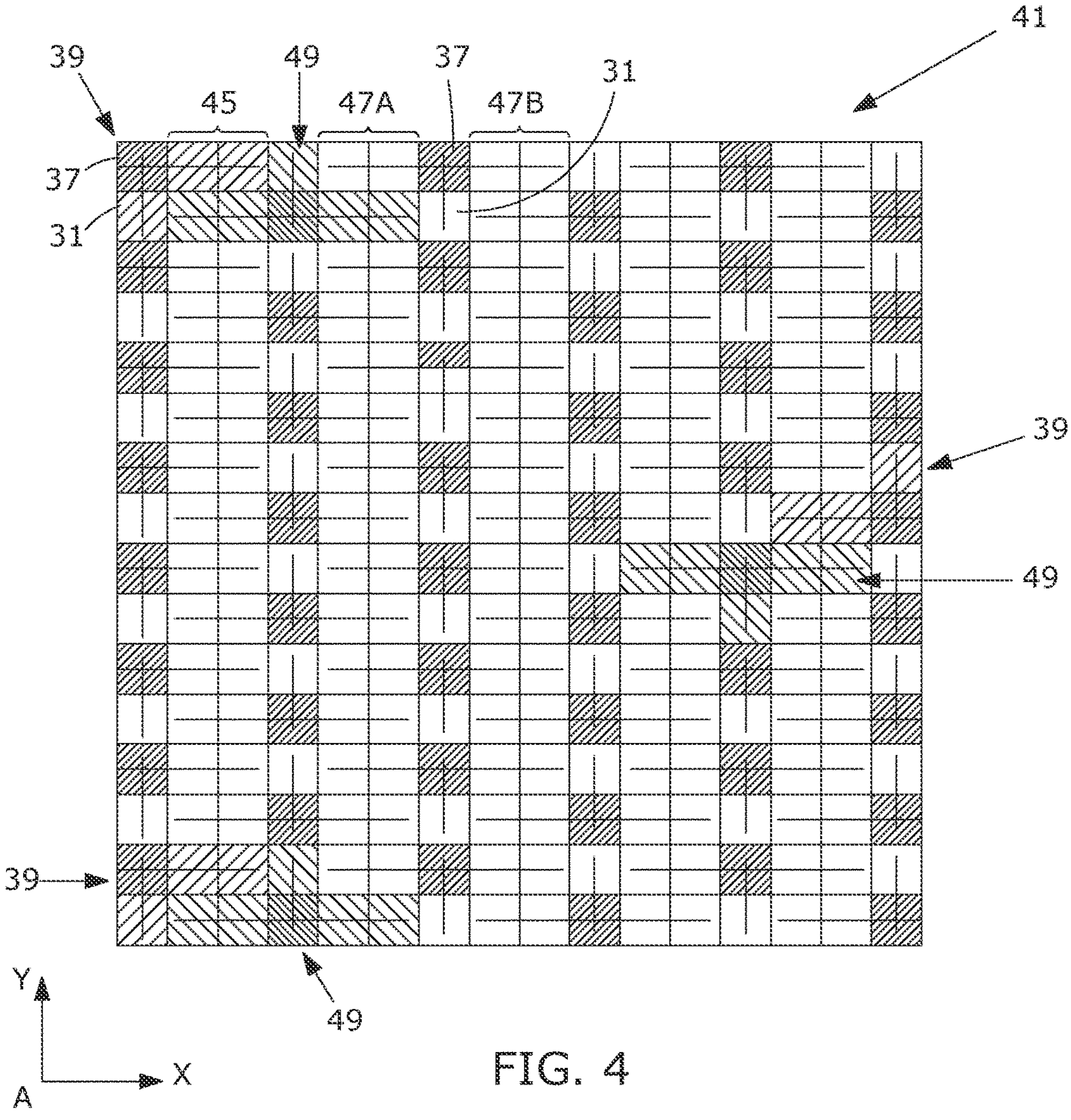
FIG. 4 illustrates a top view of a material handling storage grid for a logistics hub in accordance with one embodiment.

Referring to FIG. 4, a top view of a material handling storage grid for a logistics hub is illustrated in accordance with some embodiments. In various embodiment, the logistics hub includes a logistics tower with multiple grid-levels configured as illustrated in FIG. 4 located one over another. As is described below, a logistics tower constructed with multiple grid-levels configured as illustrated in FIG. 4 also includes a material exchange level employed for loading newly received material into the logistics hub and removing material from the logistics hub. The features included in the material exchange level are described in greater detail below and can vary depending on whether the logistic hub is a warehouse facility, a distribution center, a fulfillment center or a micro-fulfillment center. For example, a warehouse or distribution center is configured for bulk drop-off and pickup provided by tractor trailers or other large volume material haulers. In contrast, a micro-fulfillment center may routinely operate with end consumers or last mile couriers picking up material at the logistics hub.

For example, as illustrated and described in commonly-owned U.S. Patent Publication No. US 2022/0194699, some approaches provide logistic tower-based storage systems with a compact footprint provided by the tower configuration and hi-speed material handling provided with a winch based tower bot drive system. The disclosure of U.S. Patent Publication No. US 2022/0194699, entitled "Logistics Tower," published Jun. 23, 2022, is herein incorporated by reference in its entirety.

In the illustrated embodiment, the material handling storage grid has dimensions of 16 cells wide by 16 cells deep. However, material storage grids can include a smaller quantity of storage cells or a larger quantity of storage cells depending on the embodiment. For reference, FIG. 4 includes a coordinate system A including an x-axis and a y-axis. In addition, the material handling storage grids can be configured with dimensions that are not symmetrical. For example, in some embodiments the grid can include a larger quantity of cells in the x-direction and a smaller quantity of cells in the y-direction or vice versa depending on the embodiment. That is, the quantity of cells in the x-direction and the y-direction need not be equal. In addition, the quantity of cells in either or both of the x-direction and the y-direction can include an odd number of cells in some embodiments.

In addition, various embodiments of logistics tower with multiple grid-levels configured as illustrated in FIG. 4 also include a vertical retrieval system. These vertical retrieval system are typically located above the uppermost material handling storage grid 41 in the logistics tower. As described below, the vertical retrieval system generally includes a lift system located above each of the vertical elevator columns included in the logistics tower. The vertical retrieval system generally includes a winch, a cable and a robotic bin handler. The overall operation includes raising and lowering the robotic bin handler to pick and move storage bins (or "totes") located within the logistics tower storage-grid array within the logistics tower.

In the illustrated embodiment, the cell structure of the grid-level is formed using only a plurality of the first and second sets of cells 39, 49, respectively, as illustrated and described in FIGS. 3A and 3B. As seen in FIG. 4, these two sets of cells 39, 49 can be employed to construct a grid-level storage array in which every grid location is occupied with a functional element including either an elevator cell 37 or a storage cell 31. That is, the grid does not include any unoccupied space. For reference in FIG. 4, a subset of the first set of cells 39 and a subset of the second set of cells 49, respectively, are highlighted in a manner that distinguishes the two configurations.

Applicant has realized the advantage of employing a double deep storage cell configuration to scale a logistics tower that maximizes efficiency with 100% utilization of space. In particular, the illustrated embodiment employs the two sets-of-cells elements 39, 49—an L-shape and a T-shape, that each include at least one double deep set of storage cells. The approach can be generalized as follows, for each set of cells that includes a double deep configuration for at least one pair of storage cells:

Total cells included in a set of cells=2×N (N is an integer greater than 1); where Y equals quantity of double deep (DD);

$$N = \frac{\text{total quantity of cells in set}}{2}; \qquad \text{Eq. 1}$$

$$Y = N - 1 \qquad \text{Eq. 2}$$

For a set of cells having a known quantity, the integer N can be solved for using Equation 1, and with N determined, a value Y is found using Equation 2. For example, to determine the quantity of double deep (DD) pairs for a set of cells including four cells=4 solve Equation 1 to determine that N=2. Equation 2 yields a quantity of 1 double deep pair included in a 4 cell set of cells to provide a building block for constructing a storage cell array that maximizes efficiency by eliminating unoccupied cell locations. As another example, to determine the quantity of double deep (DD) pairs for a set of cells including six cells=6, solve Equation 1 to determine that N=3. Equation 2 yields a quantity of 2 double deep pairs included in a 6 cell set of cells to provide a building block for constructing a storage cell array that maximizes efficiency by eliminating unoccupied cell locations. The preceding approach also scales by eliminating unoccupied spaces for both storage arrays that are smaller than the and larger arrays than illustrated in FIG. 4 to maximize efficiency and increase storage density for logistics towers with selected geometry.

FIG. 4 also illustrates a horizontal reach from each elevator cell 37 within each set of cells 39, 49 using a set of intersecting reference lines included in each set of cells. These reference lines illustrate a direct path from the elevator shaft in any set of cells 39, 49 to each of the storage cells 31, 45, 47A, 47B included in the associated set of cells. A robotic bin handler operating within the elevator shaft of any one of the sets of cells 39, 49 directly reaches each of the single deep storage cells 31 adjacent the elevator shaft. For each pair of double deep cells 45, 47A, 47B, the robotic bin handler in the associated elevator shaft directly reaches each of the storage cells in the pair that is immediately adjacent to the elevator shaft 37. The second or far storage cell is reached by the robotic bin handler via the storage cell that is positioned between the elevator shaft 37 and the far storage cell.

Figure 5:
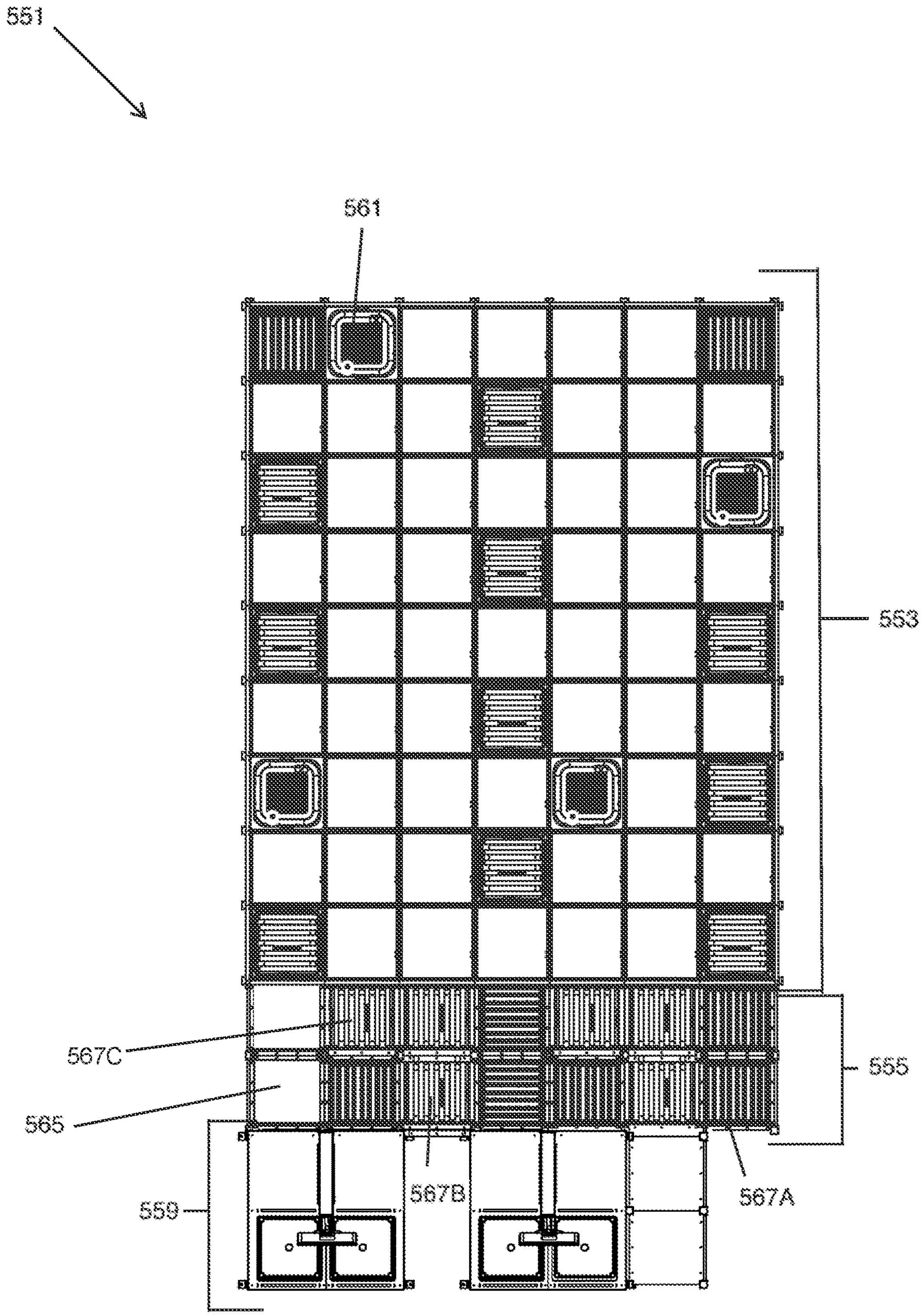
FIG. 5 illustrates a top view of a logistics hub in accordance with one embodiment.

Referring now to FIG. 5, a logistics hub 551 including a multi-level storage array 553 is illustrated in accordance with some embodiments. In various embodiments, the logistics hub 551 employs multiple double-deep sets of cells. These can include sets of cells having a three-bay double-deep configuration. According to the illustrated embodiment, the logistics hub 551 includes a conveyor grid located beneath the bottom array of storage cells, a material transfer section 555 and a pickup section 559.

The storage array 553 includes a plurality of winch-based retrieval systems 561, also referred to as "towerbots". A plurality of storage bins 565 are employed to store material in the logistics hub 551. The conveyor-grid system includes multiple conveyors, for example, a first conveyor 567A, a second conveyor 567B, a third conveyor 567C and other conveyors. The conveyors are assembled using individual conveyor tiles that are laid out adjacent to one another on the base of the logistics hub 551. In the illustrated embodiment, the conveyors 567 are located at the base of the logistics hub beneath the multi-level storage array 553. Here, the conveyors 567 run in a first direction from beneath the multi-level storage array 553 through the material transfer section 555 to the pickup section 559, or alternatively, in a second direction opposite the first to move storage bins from pickup section 559 or the material transfer section 555 to beneath the storage array 553.

Figure 8:
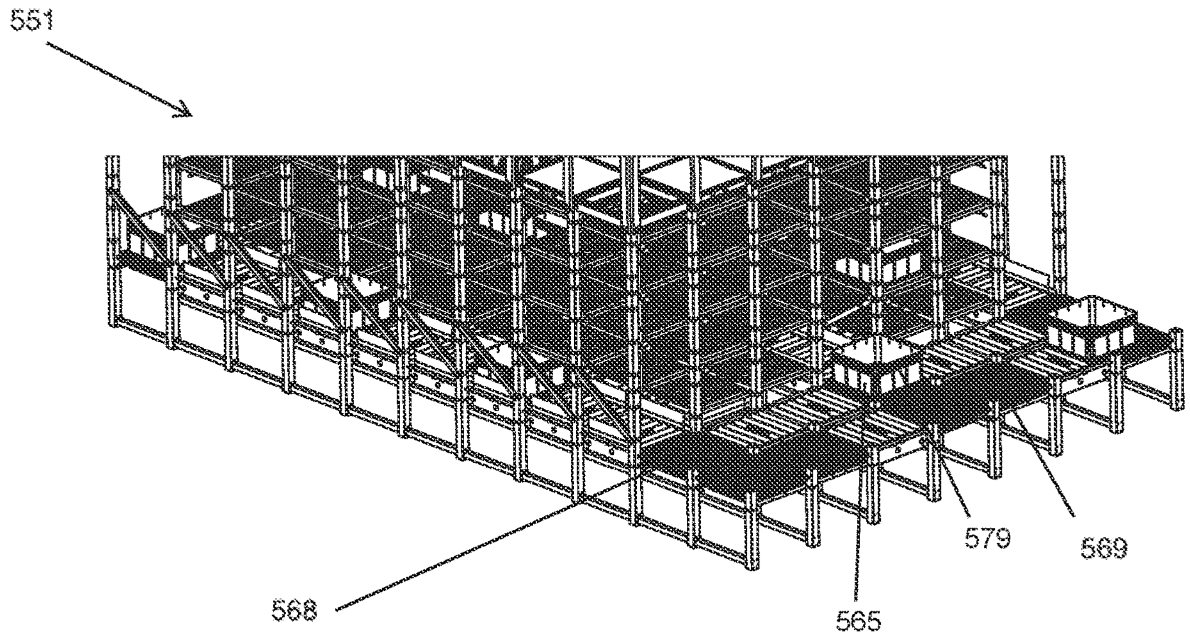
FIG. 8 provides a view of details included in the logistics hub of FIG. 5 in accordance with one embodiment.

Referring now to FIG. 8, the conveyor tiles can include a standard conveyor tile 568 and a right-angle transfer tile 569 right angle transfer conveyor tile. According to one embodiment, the standard conveyor tile 568 includes at least one motor-driven roller in combination with multiple idler rollers. In operation, the standard conveyor tile 568 moves a storage bin on a straight path along the longitudinal axis of the conveyor. The motor can be operated to provide a conveyor tile that can reverse directions. The right-angle transfer tile 569 includes a set of motorized rollers that are positioned at a right angle to the longitudinal axis of the conveyor when set in place. The right-angle transfer tile 569 includes motorized rollers that operate to shift the path of travel of a storage bin by 90 degrees. In operation, the right-angle transfer tile 569 includes an off state in which the tile allows a storage bin to continue on a straight path along the longitudinal axis of the conveyor 567. The right-angle transfer tile 569 also includes an on-state in which the motorized operation of the rollers directs a bin at a right angle off of a first conveyor to an adjacent grid located in a second conveyor.

These motorized conveyor tiles 568, 569 provide the force to selectively move storage bins 565 located on the conveyor tile 567 in a first direction or a second direction 180 degrees opposite the first direction. When placed adjacent one another in a straight alignment, the conveyor tiles 567 move storage bins 565 directly in the first direction or the second. This configuration is employed, for example, to form a row of conveyor tiles in the material transfer section 555 that are located beneath a corresponding row in the storage array 563 that include elevator cells. The transfer tiles 569 are employed in the conveyor grid to allow bins to change a direction of travel. A conveyor grid assembled from a grid of individual conveyor tiles 568, 569 allows for a rapid movement of storage bins 565 combined with precision control of the travel, the direction and the speed as a storage bin moves from a first location in the logistics hub 551 to a second location in the logistics hub 551. For example, a control system can selectively operate the transfer conveyor tiles 569 to move storage bins between conveyors. In various embodiments, this can be completed using a tile-by-tile control of the operation of the overall conveyor system.

In general, operation of the logistics hub 551 allows a user to pickup material at a selected one of the pickup locations in the pickup section 559. A control system is employed to identify a selected material for pickup and direct an operation of the winch-based lift system to remove the material from the storage array 553 (where it is stored in a bin) and place the bin on a conveyor included in the material transfer section 555. The material transfer section 555 operates to move the bin to the pickup station.

Figure 6:
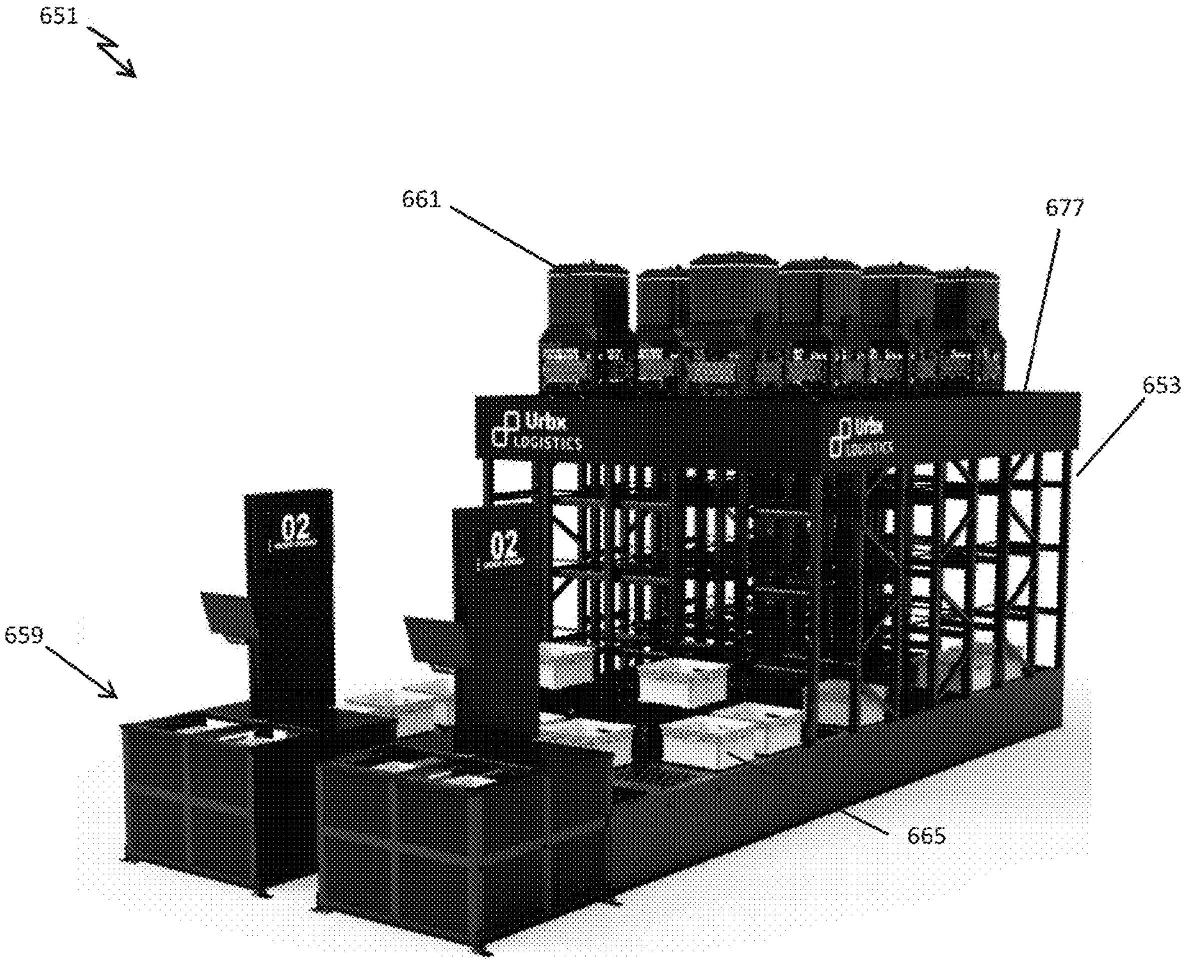
FIG. 6 illustrates a perspective view of a logistics hub in accordance with one embodiment.

Referring now to FIG. 6, a logistics hub 651 is illustrated in accordance with an embodiment that includes mobile towerbots 661. Each towerbot includes a winch system configured to raise and lower a bin handler. In addition, each towerbot includes sets of wheels and a motor operated drive system to provide power to the sets of wheels. The logistics hub 651 includes a multi-level storage array 653 and an upper level 677. The multi-level storage array 653 is configured to provide elevator cells that are arranged one above the other to form vertical shafts from the upper level 677 to a material transfer level located at the base of the logistics hub 651. The multi-level storage array 653 also includes storage cells configured to retain storage bins 665. Each towerbot 661 is in communication with a central control system which communicates data including operating instructions to the towerbot 661. The operating instructions provide the information needed for the towerbot 661 to coordinate its activities in the logistics hub 651 to move storage bins within the multi-level storage array 653.

Figure 7:
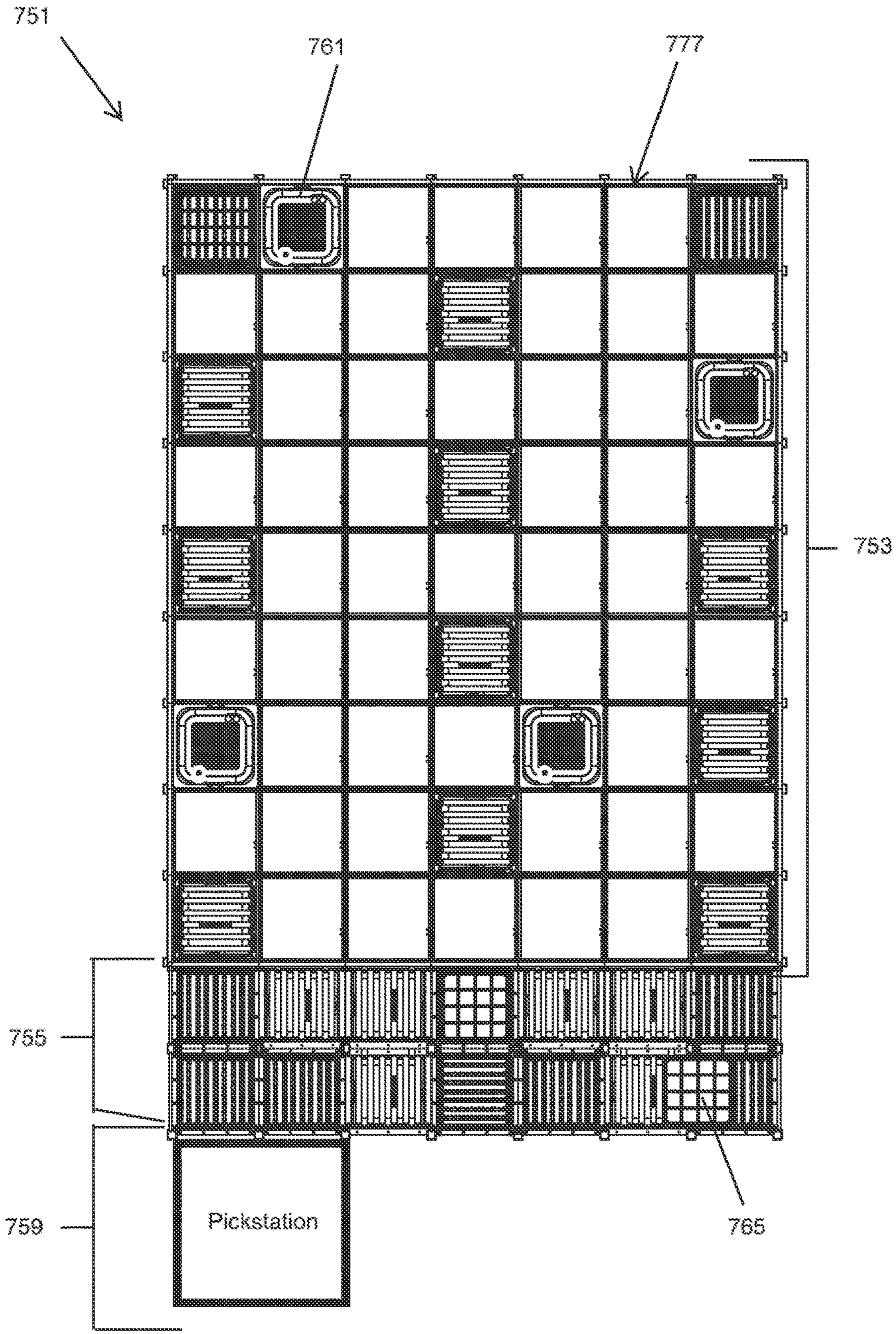
FIG. 7 provides a top view of a logistics hub in accordance with one embodiment.

Referring to FIG. 7, a logistics hub 751 is illustrated in accordance with another embodiment that includes mobile towerbots 761. FIG. 7 provides a top view showing the structure of the upper level 777 upon which the towerbots 761 move between positions above different elevator column included in a multi-level storage array 753. These operations are described in further detail below.

Referring again to FIG. 8 for a closer view of the storage cart 565, the storage cart structure includes a rim 579. According to some embodiments, described in greater detail below, the rim 579 is utilized by a locking system included in the bin handler of the towerbot 551, 661, 761, 1061, 1161 to securely grip the storage bin 565 for transport within multi-level storage array 553, 653, or the vertical storage grid 1075 of FIG. 10, described below. According to the embodiment illustrated in FIG. 8, the rim 579 includes a raised edge that is more easily engaged with by the locking mechanism included in the bin handler.

Figure 9A:
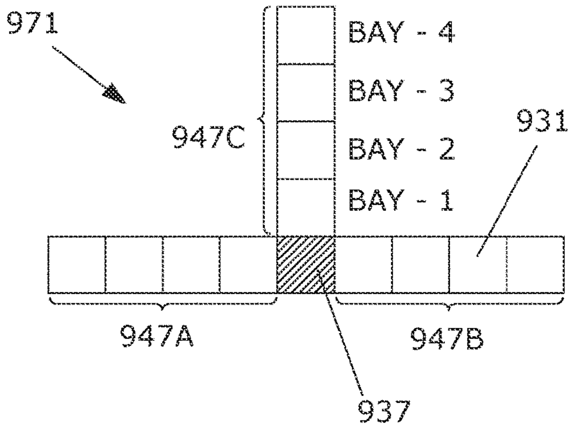
FIGS. 9A and 9B illustrate model sets of cells for use in a material handling storage grid for a logistics hub in accordance with one embodiment.

Referring to FIG. 9A, a top view of a model set of cells 971 for use in a material handling storage grid for a logistics hub is illustrated in accordance with various embodiments. The model set of cells 971 includes an elevator cell 937 and a group of storage cell 931 located on three sides of the elevator cell 937 to form an inverted T-shape. In the illustrated embodiment, each of the three sides include 4 bays of storage cells. For example, a first group of storage cells 947A is located on a first side of the elevator cell 937, a second group of storage cells 947B is located on a second side of the elevator cell 937 and a third group of storage cells 947C is located on a third side of the elevator cell.

The overall configuration of the model set of cells 971 is referred to as being a three bay configuration because the elevator cell 937 accesses storage cells on each of three sides. In the illustrated embodiment, each of the first group of cells 947A, the second group of cells 947B and the third group of cells 947C include four storage cells, referred to individually as a "quad-set." This configuration can be used where a tower bot employed with the set of cells is configured to extend four-bays deep within the storage grid. The model set of cells 971 illustrated in FIG. 9A is referred to as a three-bay quad configuration because it includes at least one storage cell on three of the four sides of the elevator cell 937 with at least one group of four-deep storage cells. Although illustrated as three quad groups, other configurations can be employed, for example, each of the three groups 947A, 947B, 947C can be a double deep pair of cells as shown and described above with reference to FIGS. 3A and 3B and double-deep pairs 45, 47A, 47B. Other combinations of storage cells can be configured in different groups around a single elevator cell in various embodiments.

The groups of storage cells in a set of cells are serviced by robotic bin handlers that are raised and lowered within the elevator cell. Each bin handler is part of a towerbot vertical retrieval system that raises and lowers the bin handler itself. The bin handler is configured to vertically align in the elevator cell with the storage cells at a selected level from which it can extend laterally (for example, horizontally) to reach into the adjacent groups of storage cells to the required depth to retrieve (or return) storage carts to a desired location in the storage array. According to some embodiments, a towerbot retrieval system includes an upper assembly including at least one winch and an associated cable employed to raise and lower the bin handler within an elevator shaft.

As illustrated and described with reference to FIGS. 3A, 3B and 9A, sets of storage cells including a single tower bot location can be provided in a variety of configurations including a wide variety of different configurations each having at least one double deep pair of storage cells. These different double deep configurations can be used in various combinations to maximize the storage cell density by greatly reducing or eliminating unoccupied cell locations in a multi-level storage array.

Figure 9B:
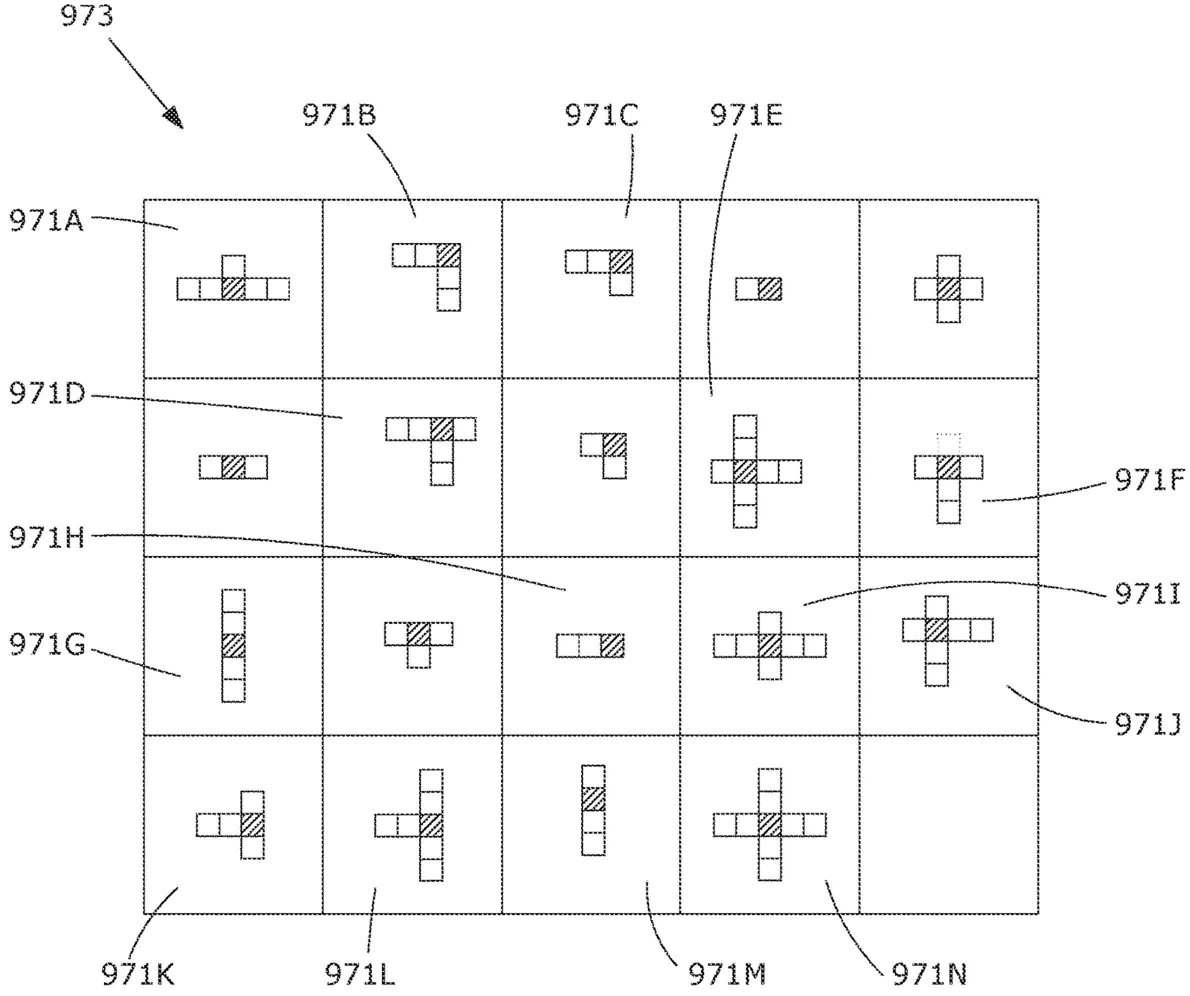

FIG. 9B illustrates a variety of different combinations and configurations of cells that can be employed in creating a multi-level storage array. The model sets of cells 973 includes many sets of cells that have at least one double deep set of storage cells in combination with an elevator cell serviced by a towerbot. These include a first three bay double deep configuration 971A with two pairs of double deep cells located on opposite sides of the elevator cell. A first two bay double deep configuration 971B with two pairs of double deep cells located on adjacent sides of the elevator cell. A second two bay double deep configuration 971C including one pair of double deep cells and a single deep cell. A second three bay double deep configuration 971D with two pairs of double deep cells located on adjacent sides of the elevator cell and a single deep cell on a third side. A first four bay double deep configuration 971E with three pairs of double deep cells located on three sides of the elevator cell and a single deep cell located on the fourth side. A second four bay double deep configuration 971F including a single pair of double deep cells with a single deep cell located on each of the three remaining sides, respectively. A third two bay double deep configuration 971G including two pairs of double deep cells located on opposite sides of the elevator cell. A first single bay double deep configuration 971H having a single pair of double deep cells. A third four bay double deep configuration 971I with two pairs of double deep cells located on opposite sides of the elevator cell and single deep cells located on the two remaining sides, respectively. A fourth four bay double deep configuration 971J including two pairs of double deep cells located on adjacent sides of the elevator cell and single deep cells located on the two remaining sides, respectively. A third three bay double deep configuration 971K including a single pair of double deep cells with single deep cells located on the two sides adjacent the pair of double deep cells. A fourth three bay double deep configuration 971L including three pairs of double deep cells. A fourth two bay double deep configuration 971M with a single pair of double deep cells and a single deep cells located opposite the double deep cells. A fifth four bay double deep configuration 971N including four pairs of double deep cells, one located on each side of the elevator cell, respectively. The remaining model sets of cells 973 illustrated in FIG. 9B do not include any pairs of double deep cells.

In some embodiments, a storage cell array that maximizes efficiency and meets performance requirements is determined using an array-construction design algorithm. The algorithm can employ inputs including combinations of: a) desired storage density (for example, the capacity/square foot of the footprint of the storage array); b) desired speed of material handling (for example, a maximum transit time between a bin-pickup at a storage cell location to delivery at a pickup station); and c) total available space given the available array height. These three factors (and others) can be weighted based on their degree of importance for a particular site and application. For example, where the material-handling speed is of primary importance, a higher percentage of single deep sets of cells can be employed. Conversely, where storage density is of primary importance, a higher percentage of double deep sets of cells can be employed. In general, the approach is employed to adjust the selection of the various types of sets of cells to meet the project objectives while eliminating unoccupied spaces to maximize efficiency and increase storage density for logistics towers.

Figure 10:
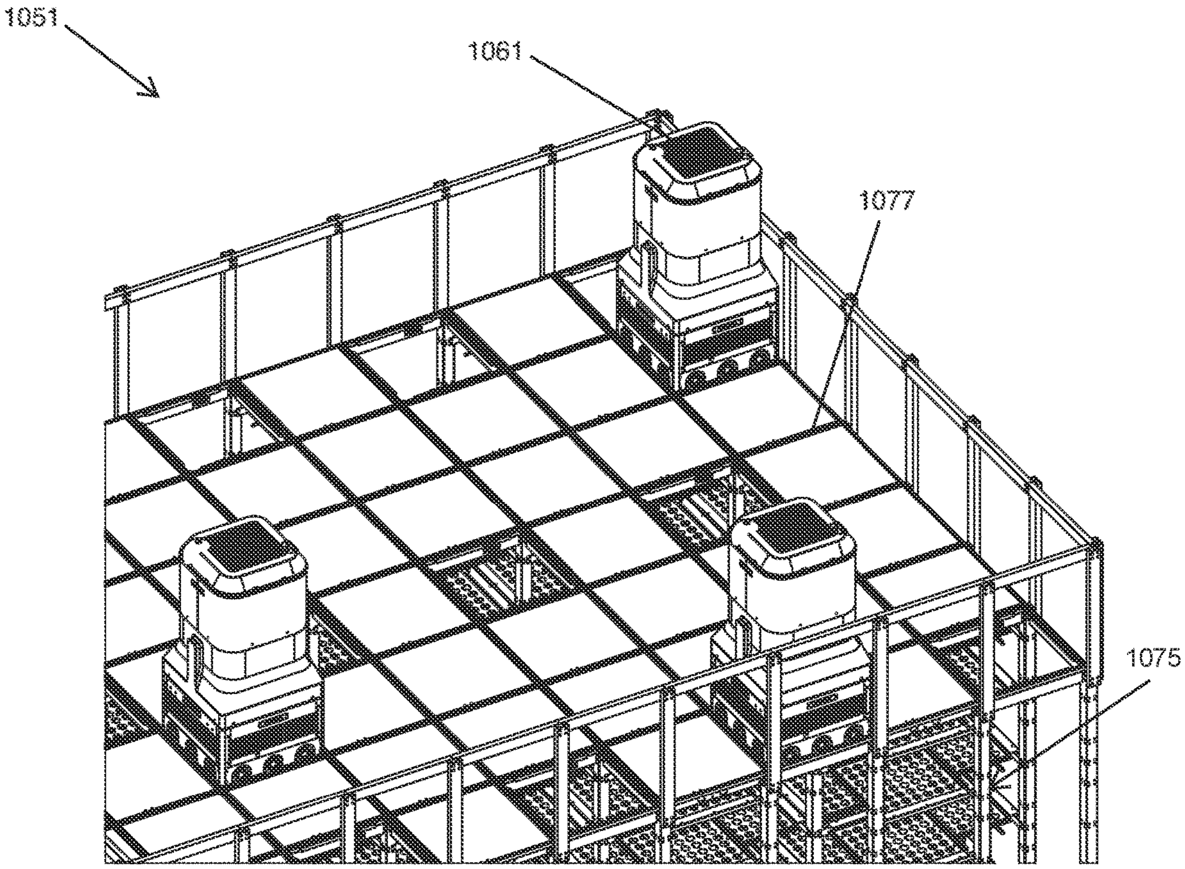
FIG. 10 illustrates a partial view of a logistics hub in accordance with one embodiment.

Referring now to FIG. 10, a top level of a multi-level storage array system 1051 is illustrated in accordance with various embodiments. The system 1051 includes a plurality of mobile towerbots, for example, mobile towerbot 1061. Each towerbot includes a winch system and a bin handler. In addition, each towerbot includes sets of wheels and a motor operated drive system to provide power to the sets of wheels. The system 1051 includes a vertical storage grid 1075 and an upper level 1077. The vertical storage grid 1075 is configured to provide elevator cells that are arranged one above the other to form vertical shafts that extend from the upper level to a material transfer level located at the base of the multi-level storage array system 1051. The vertical storage grid 1075 also includes storage cells configured to retain storage bins. Each towerbot 1061 is in communication with a central control system which communicates data including operating instructions to the towerbot 1061. The operating instructions provide the information needed for the towerbot 1061 to coordinate its activities in the multi-level storage array system 1051 to move storage bins within the storage grid 1075.

A bin handler included in each towerbot is raised or lowered as needed to access bins adjacent the elevator cell in which the bin handler is operating. When properly aligned at a desired level within the storage grid 1075, a carriage included in the bin handler extends into and out of the storage cells to place or remove storage bins from locations within the grid. As described above, the sets of cells can be provided in a variety of configurations designed to maximize efficiency. According to some embodiments, a variety of sets of cells including double deep configurations are included in the storage grid 1075. In these double deep configurations, the carriage included in the bin handler can extend thru a storage cell immediately adjacent the elevator cell in which the bin handler is located to access the storage cell that is one-cell removed from the elevator cell.

According to the embodiment illustrated in FIG. 10, the upper level 1077 of the storage grid 1075 includes panels located at the top of any vertical column that is not an elevator column. According to other embodiments, panels are not included at the upper level 1077. Instead, the top of the multi-level storage array system 1051 is an open grid. In various embodiments, the towerbots 1061 are self-contained mobile systems that can move horizontally across the top of the storage grid 1075 on the upper level 1077 to locate above different columns. The ability to dynamically relocate towerbots 1061 can reduce the total quantity of towerbots required in the system 1051. The flexibility provided by self-movable towerbots 1061 can be employed in combination with the approaches illustrated and described with reference to FIGS. 3A, 3B, 4 and 9 to deliver the most efficient use of space serviced by an ideal quantity of tower bots. The approach also supports a larger scale dynamic reconfiguration of the system that can, for example, include converting an elevator column into a column for storage cells or vise versa without the need to make any permanent adjustment to the location of the individual towerbots 1061.

Figure 11:
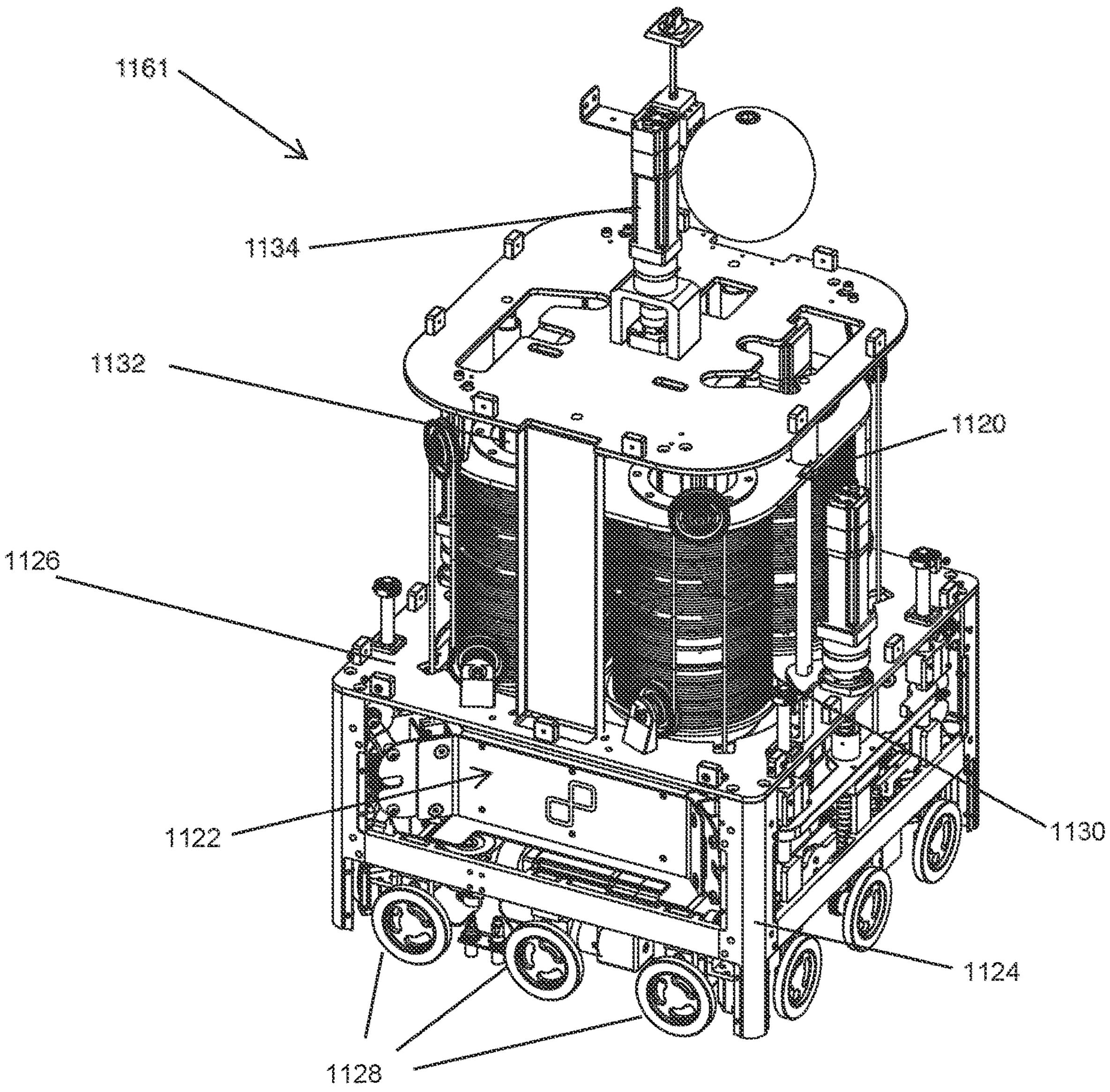
FIG. 11 illustrates a towerbot in accordance with one embodiment.

Referring now to FIG. 11, an isometric view of a towerbot 1161 is provided in accordance with one embodiment. According to this embodiment, the towerbot 1161 includes a winch system 1120, a bin handler 1122, a frame 1124, a central plate 1126 and a pair of wheels 1128. The winch system 1120 includes a plurality cable reels 1130 each having an associated motor 1132 and a linear actuator 1134 to provide vertical travel of the winch system 1120 within the frame 1124. The bin handler includes the carriage which is illustrated and described in detail, below.

In the illustrated embodiment, each of the four cable reels 1130 are connected to a different corner of the bin handler 1122 by a cable wound around the reel, respectively. The overall operation of the towerbot 1161 when located over an elevator column includes raising and lowering the bin handler 1122 for the transfer of storage containers within the multi-level storage array system 1051. When a bin handler is being lowered, cable is advanced or "payed out" from each reel at the same rate to maintain the bin handler in a level orientation. The motor 1132 associated with each reel 1130 rotates the reel in a first direction of rotation to advance the cable. The direction of rotation of the motor is reversed to raise the bin handler by retrieving the cable and rewinding the cable around the reel. In each instance, the actuator 1134 operates to cyclically lower and then raise the winch assembly 1120 within the frame 1124 of the towerbot 1061. This vertical displacement of the winch assembly through a limited range of motion is completed to evenly wind and unwind the cable around the reel.

According to some embodiments, the bin handler 1122 includes a sensor package, for example, an inertial sensor package to provide feedback concerning a pitch and yaw of the bin handler. For example, the sensor package can include one or more accelerometers. Feedback provided by the sensor package is employed by a towerbot control system to control operation of the motors as cabling is wound/unwound around the reels such that the bin handler is kept level. The control of the motors can act to increase or decrease the rate at which a motor spins as cable is wound/unwound. The control can be performed uniformly across all four motors/reels or independently if needed to adjust the bin handler back to level.

Each towerbot 1061, 1161 includes wheels located on each of the four sides of the towerbot 1161. In various embodiments, the framework provided by the upper level 1077 of the storage grid 1075 provides a rail or track system on which the towerbots 1061, 1161 can move across the top of the multi-level storage array system 1051 to position themselves above a desired elevator column. In some embodiments, the rail or track system is an integral part of the storage grid framework. In other embodiments, the rail or track system is an independent hardware system that is secured to the storage grid framework. In either approach, two pairs of wheels (for example, the pairs of wheels 1128) located on opposites sides of the towerbot 1161 engage with the rail/track system to drive the towerbot 1161 along the upper level 1077 from a first position above a first elevator column location to a second position above a second elevator column location. This is described in greater detail below.

In various embodiments, the multi-level storage array system 1051 and the towerbots 1161 themselves include various design features to facilitate the mobility of the towerbots 1161. For example, a towerbot control system included in the multi-level storage array system 1051 includes wireless data communication between each towerbot and a central controller. The wireless communication allows the system controller to provide instructions to individual towerbots to initiate a move from a first position to a second position along the upper level 1077. The same communication system is used to provide the instructions for operation of the bin handler and the associated carriage assembly. For example, a towerbot may receive instructions that identify a first set of cells on a selected level where a storage bin needs to be accessed. The towerbot operates with this information to position the bin handler to move the storage bin from its current location to the conveyor system located on the material transfer level of the multi-level storage array system 1051.

The upper level 1077 of the storage grid 1075 includes location-tags using any one of a variety of technologies depending on the embodiment. According to some embodiments, tags suitable for optical scanning are affixed on the storage grid, for example, QR code tags can be employed. In this embodiment, the towerbot 1161 includes a camera-based system or other optical reader configured to read location data from the QR code as the towerbot navigates along the upper level 1077. According to other embodiments, RFID technology is employed. For example, RFID tags can be located on the upper level 1077 of the storage grid 1075. In this embodiment, the towerbot 1161 includes an RFID reader configured to read the RFID tags to determine the towerbot's present location on the upper level 1077.

The mobility of the towerbots 1161 is supported by other features of the overall multi-level storage array system 1051. The wireless communication system that provides a communication network for the bi-directional transfer of information and data between the towerbots 1161 and the central controller is one example. In addition, the towerbots 1161 can include an integral source of power that permits towerbot operation as towerbots move across the top of the storage grid 1075. According to this embodiment, a towerbot 1161 includes a battery with sufficient capacity to power the drive motors that operate when the towerbot changes locations. This embodiment allows a towerbot that includes a wired power connection when in place above an elevator column to operate without any external wired connections during a period in which it moves between locations.

Figure 12:
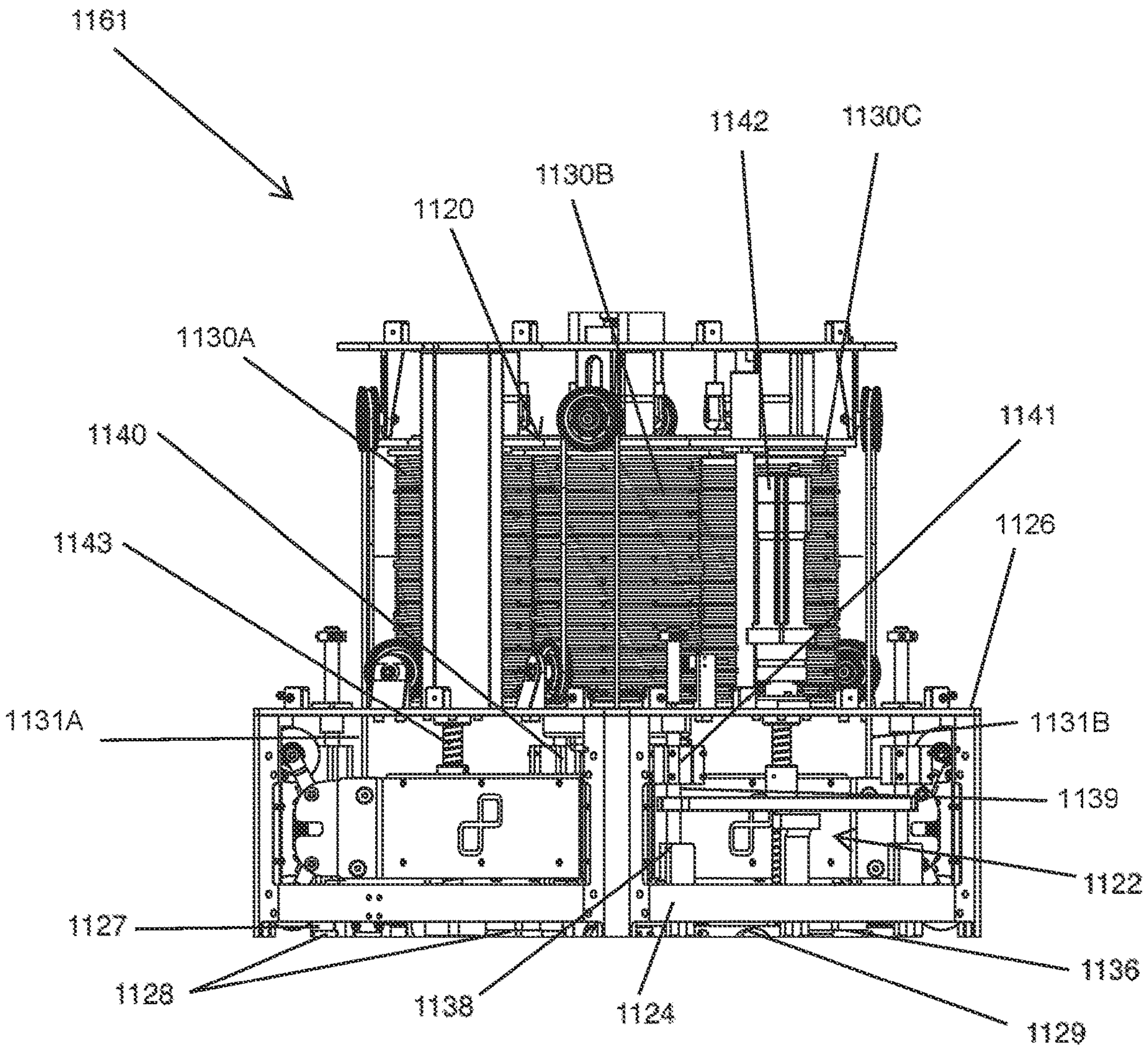
FIG. 12 illustrates a partial view of the towerbot of FIG. 11.

Referring to FIG. 12, additional details concerning the towerbot 1161 are illustrated in accordance with various embodiments. FIG. 12 provides a partial view showing three of the four reels 1130A, 1130B, 1130C included in the winch system 1120 along with two of the four cables 1131A, 1131B. A first pair of wheels 1128 is illustrated along with a second pair of wheels 1129. A third pair of wheels located on a side opposite the second pair of wheels 1129 is partially visible, see single wheel 1145 of the third pair of wheels. FIG. 12 also provides a partial view of a carriage 1136 included in the bin handler 1122 showing portions that are not otherwise obscured by the frame 1124. The two pairs of wheels 1128, 1129 are coupled to a first wheel-frame 1138 and a second wheel-frame 1139, respectively. A first drive system 1140 is located at the top of the first wheel-frame 1138. A second drive system 1141 is located at the top of the second wheel-frame system 1139. In addition, the towerbot 1161 includes an actuator 1142 and a drive rod 1143. According to the illustrated embodiment, the towerbot 1161 is located on a storage grid.

The cables 1131A, 1131B extend from the reels 1130A, 1130B, 1130C to a corner of the bin handler 1122, respectively. This configuration allows the bin handler 1122 to be suspended within the frame 1124 of the towerbot 1161 when not in use. The cables are also employed to suspend the bin handler 1122 as it is raised and lowered within an elevator column of the multi-level storage array 1051.

The pairs of wheels, for example, the first and second pair of wheels 1128, 1129, are located on each side of the towerbot 1161. The two pairs of wheels located on opposite sides of the towerbot 1161 from one another operate together to move the towerbot 1161 in a first horizontal direction and a second horizontal direction that is opposite the first horizontal direction. The other two pairs of wheels are located on the remaining two sides of the towerbot 1161 opposite from one another. These two pairs of wheels operate together to move the towerbot 1161 in a third horizontal direction and a fourth horizontal direction that is opposite the third horizontal direction. Each of the third horizontal direction and the fourth horizontal direction is perpendicular to both the first horizontal direction and the second horizontal direction in the illustrated embodiment. This arrangement allows the towerbot 1161 to move along all four axes of the upper level 1077 of the storage grid.

Each pair of wheels includes a drive system including a motor and drive linkage to connect the motor to the wheels included in the pair of wheels 1128, 1129. In the illustrated embodiment, the first drive system 1140 is located on the first wheel-frame 1138. A belt, chain or other linkage connects the rotating output of the drive motor to each wheel include in the pair of wheels 1128. Similarly, the second drive system 1141 is located on the second wheel-frame 1139. Here, the rotating output of the drive motor is coupled by linkage hardware to each wheel include in the pair of wheels 1129.

To allow for the freedom of movement of the towerbot 1161 from column to column of the storage grid, the pairs of wheels include an elevating mechanism employed to raise and lower each pair, respectively. This approach permits a temporary disengagement of the pair of wheels from the tracks or guide rails on which the towerbot 1161 moves. That is, each of the pairs of wheels remains in lowered position engaged with guide rails or tracks when the towerbot 1161 is in a stationary position on the upper level 1077 of the storage grid. Each wheel-frame is also connected to an actuator via an associated drive rod, for example, the actuator 1142 and drive rod 1143 connected to the first wheel-frame 1138. In some embodiments, the actuator includes a motor and the drive rod couples the rotating output of the motor to the wheel-frame, for example, using a worm gear connection. According to these embodiments, the actuator operates to raise and lower the pair of wheels by raising and lowering the wheel-frame.

Referring to an operating state of the towerbot 1161 illustrated in FIG. 12, the first pair of wheels 1128 is in a raised position in which the wheels are disengaged with the storage grid. The second pair of wheels 1129 is in a lowered position in which the wheels are engaged with the storage grid. In this operating state, the third pair of wheels (partially visible as represented by the single wheel 1127) is also positioned in engagement with the storage grid. In this state, the towerbot 1161 can move along the storage grid in either of two directions. A first direction that is generally toward a viewer of FIG. 12 and a second direction directly opposite the first.

For the purpose of explanation, an operation of the towerbot 1161 is described in which the towerbot is placed into a state for movement along the storage grid in the directions generally toward or away from the viewer as viewed in FIG. 11. The towerbot 1161 begins in an at-rest state above a first elevator column with the bin handler 1122 fully drawn within the frame 1124. In this state, all four pairs of wheels (including first and second pairs of wheels 1128, 1129) are in the lowered position engaged with the storage grid. The towerbot 1161 begins a change in position by moving the first pair of wheels 1128 and the pair of wheels located opposite the first pair to a raised position in which the two pairs of wheels are no longer in contact with the storage grid. For the first pair of wheels 1128, this change in position is accomplished by operation of the actuator 1142 to move the entire wheel-frame 1138 upward. A similar operation occurs for the pair of wheels located on the opposite side of the towerbot 1161 via another actuator and drive rod combination located on that side.

With those two pairs of wheels disengaged from the storage grid, separate drive systems associated with the two pairs of wheels, respectively, operate to rotate the wheels and move the towerbot 1161 in a desired direction. Referring to the second pair of wheels 1129, the drive system 1140 operates by engaging a motor driven linkage to transfer operation of the motor to rotation of the first pair of wheels 1129. A similar operation occurs for the third pair of wheels 1127 located on the opposite side of the towerbot 1161 via another drive system located on that side. The towerbot 1161 moves along the upper level 1077 of the storage grid until it arrives at the desired location above a second elevator column. At this point, the two drive systems turn off. The actuators operate to lower the wheel-frame and attached pair of wheels for the first pair of wheels 1128 and the pair of wheels located opposite the first pair to the lowered position in contact with the storage grid. The towerbot 1161 is now in position to operate the winch system 1120 as needed to access bins in the storage cells adjacent the second elevator column at any level with in the multi-level storage array 1051.

In various embodiments, the upper level 1077 of the storage grid includes a set tracks configured for travel by the wheels of the towerbots 1161 as they travel between locations atop the storage grid. The tracks are also laid out in a grid pattern with intersections at regular intervals to allow the towerbots 1161 to travel in any of multiple directions. The control system provides the navigation instructions that permit the towerbot 1161 to travel between two known locations on the tracks without colliding with any of the other towerbots. According to one embodiment, the tracks are formed as an integral part of the structural elements of the upper level 1077 of the storage grid.

According to various embodiments, the towerbot 1161 includes a self-contained power system including a rechargeable battery to provide power to at least a drive system (for example, one or more motors and the associated mechanical connection to the wheels) that operates the wheels as the towerbot moves between locations atop the storage grid. These self-powered embodiments allow the towerbot 1161 to move between locations without the need to maintain a connection to an external power source when the towerbot is in transit between locations. According to some embodiments, the towerbot includes a contact block attached to the frame 1124. The contact block is connected to the rechargeable battery. A corresponding stationary contact block is located on the storage grid. The contact block on the storage grid is connected to a source of power used to recharge the battery included in the towerbot 1161. In these embodiments, the two contact blocks complete an electrical connection when, for example, the towerbot 1161 is in position above an elevator shaft. This provides an opportunity for the towerbot 1161 to recharge anytime it is positioned above an elevator shaft. According to further embodiments, the self-contained power system has enough capacity to operate the winch system and the bin handler in addition to the wheel motor drive system without a need for a fixed connection to a power source external to the towerbot.

Figure 13:
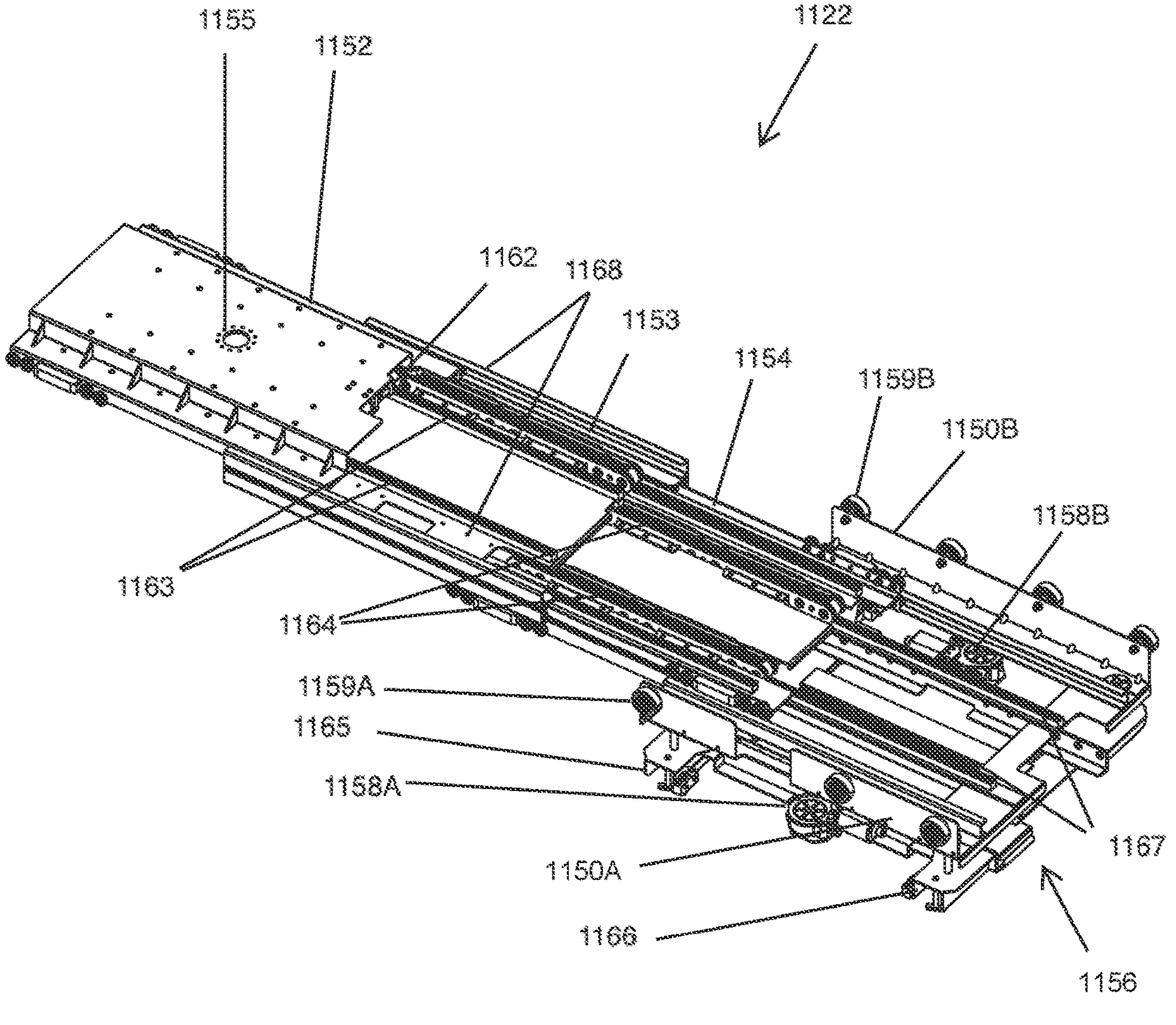
FIG. 13 illustrates a bin handler in accordance with one embodiment.

Referring now to FIG. 13, a bin handler 1112 is illustrated in accordance with one embodiment. The bin handler 1122 includes a base 1152, a first extension 1153, a second extension 1154 and a carriage 1156. The base 1152 includes a coupling 1155. The carriage 1156 includes a frame with a first rail 1150A and a second rail 1150B located on a side of the frame that is opposite the first rail 1150A. A first set of roller wheels 1159A are included on the first rail 1150A and a second set of roller wheels 1159B are included on the second rail 1150B. A locking system is affixed to the frame of the carriage 1156. The locking system includes a first locking bar 1165, a second locking bar 1166, a first locking motor 1158A and a second locking motor 1158B. The locking bars 1165, 1166 extend across and below opposite sides of the carriage 1156 perpendicular to the first rail 1150 and the second rail 1150B. Each end of the locking bars 1165, 1166 is attached at a rail 1150A, 1150B. According to the illustrated embodiment, the first locking motor 1158A is located beneath a central portion of the first rail 1150A. The second locking motor 1158B is located beneath a central portion of the second rail 1150B. The carriage 1156 also includes a pair of rails 1167 located on a top side of the frame of the carriage 1156. The pair of extensions 1153, 1154 include a drive motor 1162, a first pair of drive belts 1163 and a second pair of drive belts 1164. The first extension 1153 is attached in moveable engagement with the base 1152. The second extension 1154 is attached in moveable engagement with the first extension 1153. The carriage 1156 is attached in moveable engagement with the second extension 1154.

The first extension 1153 includes a pair of upper and lower rails 1168. According to the illustrated embodiment, the pair of rails 1168 is formed as a part of the frame of the second extension 1153. In various embodiments, the first extension 1153, the second extension 1154 and the carriage 1156 are nested together beneath base 1152 when bin handler 1122 is located within the towerbot 1161 and as it travels up and down within an elevator cell. The carriage 1156 and the second extension 1154 are attached with one another at the pair of rails 1167 provided on the carriage. The second extension 1154 is attached to the first extension 1152 at the lower rails included in the pair of upper and lower rails 1168. The first extension 1153 is attached to the base 1152 at the upper rails included in the pair of upper and lower rails 1168.

FIG. 13 illustrates the bin handler 1122 configured for operating in a storage array that includes pairs of double deep storage cells. While the storage grid 1075 is not illustrated in FIG. 13, the bin handler is shown in a fully extended position in an operation that can occur in location within an elevator column of the multi-level storage array system 1051. That is, the winch system 1120 of the towerbot 1161 has operated to lower the bin handler beneath the frame 1124 of the towerbot to a selected elevation within the storage array. From that position, the bin handler can operate to extend the first extension 1153 and the second extension 1154 from the base to move the carriage 1156 into a first storage cell located immediately adjacent the elevator column in which the base 1152 is located. The bin handler 1152 can also operate to further extend the first extension 1153 and the second extension 1154 to move the carriage 1156 into a second storage cell located on a side of the first storage cell opposite the base (i.e., to locate the carriage 1156 within the double deep cell of a pair of double deep cells).

The drive system for extension of the bin handler 1122 includes the drive motor 1162, the first drive belt 1162 and the second drive belt 1164. According to one embodiment, the first pair of drive belts 1163 includes a series of teeth configured to engage corresponding sets of teeth located on the underside of the base 1152. The second pair of drive belts 1164 includes a series of teeth configured to engage corresponding sets of teeth located on the underside of the first extension 1153. In the illustrated embodiment, the single drive motor 1162 operates to spin the first pair of drive belts 1163 around front and rear axles in the first extension 1153 while simultaneously spinning the second pair of drive belts 1164 around front and rear axles in the second extension 1154. The engagement between the sets of teeth as the drive belts 1163 rotate under the force of the drive motor provides the mechanical force to extend the first extension out from beneath the base 1152. The engagement between the sets of teeth as the drive belts 1164 rotate under the force of the drive motor provides the mechanical force to simultaneously extend the second extension out from beneath the first extension 1153. The first and second sets of roller wheels 1159A, 1159B are engaged on tracks included in the storage array 1075 when the carriage 1154 is extend into the first storage cell of the pair of double deep cell. This feature assists in maintaining the carriage in a level position within the storage cell even under the load of a storage bin. To reach the second cell of the pair of double deep cells, the drive motor 1162 operates further to spin the two pairs of drive belts 1163, 1164. This results in a further simultaneous horizontal movement in a distal direction of both the first extension 1163 and the second extension 1164, for example, to a fully extended position. In an alternate embodiment, the two pairs of drive belts 1163, 1164 are driven independently of one another such that one of the two extensions 1153, 1154 are extended serially first one then the other.

The bin handler operates the locking system included in the carriage 1156 once the carriage is extended into a storage cell. In general, the locking bars 1165, 1166 grasp opposing edges of a storage bin to secure the storage bin to the carriage for transport by the towerbot 1161 within the multi-level storage array system 1051. With the carriage 1156 extended above a single-bay storage cell or either storage cell within a pair of double deep storage cells, the locking bars 1165, 1166 are located above and immediately adjacent to opposing edges of the storage bin located in the cell. Operation of the two locking motors 1158A, 1158B moves the associated locking bar 1165, 1166 into secure engagement with two opposing edges, respectively, of the storage bin. With the storage bin securely held by the carriage 1156, the storage bin can be pulled into the elevator cell with the first extension 1153, the second extension 1154 and the carriage 1156 nested together beneath base 1152. The towerbot 1161 now operates to raise or lower the bin handler 1122 including the storage bin to a location where it is transferred to the material transfer system at the base of the multi-level storage array system 1051, or alternatively, left in another storage cell location accessible from the elevator column in which the bin handler 1122 is located.

Figure 14:
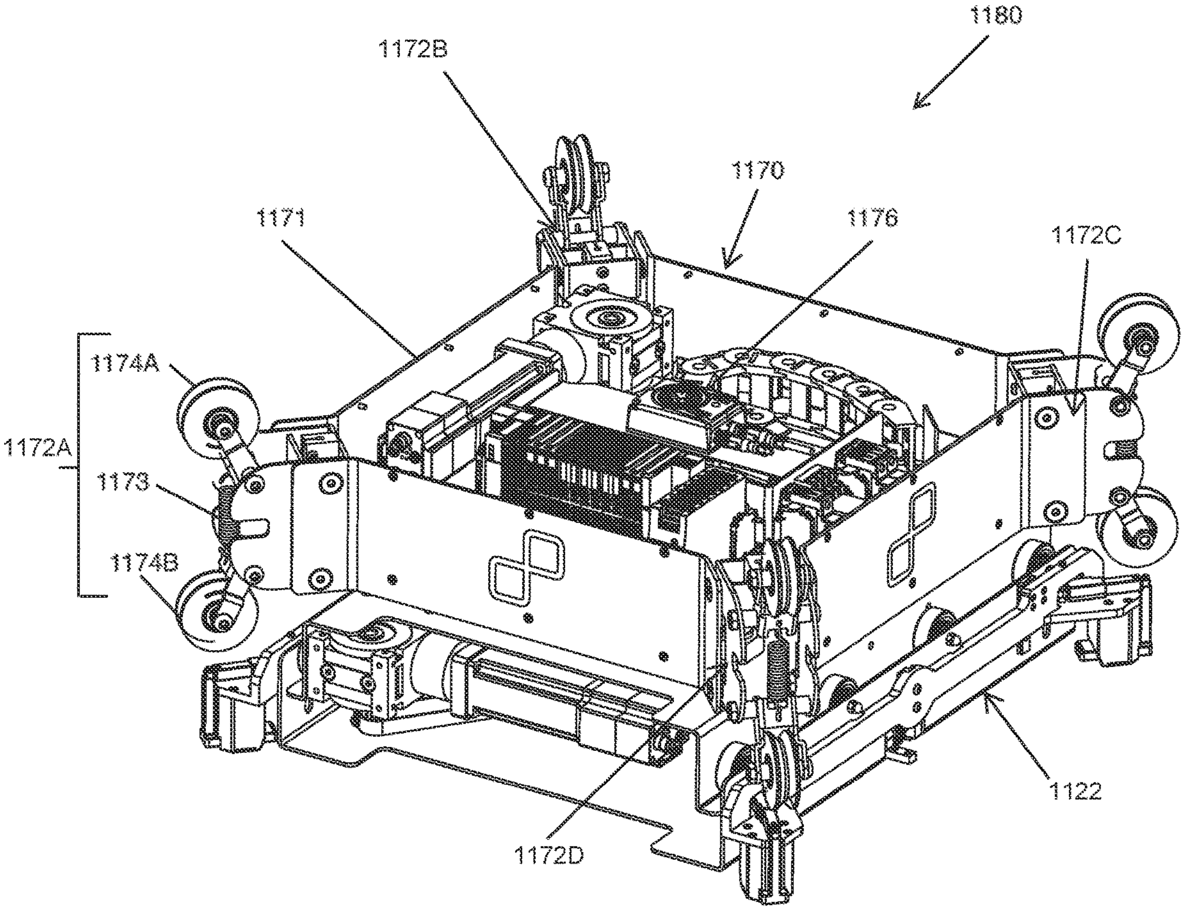
FIG. 14 illustrates a bin handler assembly in accordance with one embodiment.

In various embodiments, the bin handler 1122 rotates 360 degrees around the vertical axis of the bin handler. This allows the carriage 1156 to extend into a storage cell located on any of the four sides of the elevator cell within which the bin handler is located. Referring to FIG. 14, a view of a bin handler assembly 1180 is shown. The bin handler assembly 1180 includes the bin handler 1122 and a trolley 1170 beneath which the bin handler 1122 is located. The trolley 1170 includes a frame 1171 and four wheel assemblies 1172A, 1172B, 1172C, 1172D one located at each corner of the frame 1170. The trolley 1170 also houses a rotary drive assembly 1176.

The wheel assemblies 1172 each include a vertical frame 1173, and a pair of wheels including a first wheel 1174A and a second wheel 1174B. According to the illustrated embodiment, the wheels 1174A, 1174B are positioned in a vertical orientation in which they can engage the vertical frame of the storage array 1075 as the bin handler assembly 1180 travels up and down an elevator column in the array. In this orientation, the wheels provide smooth travel of the bin handler assembly 1180 vertically in a fixed location centered within the elevator column.

According to some embodiments, the rotary drive assembly 1176 is configured to attach to the coupling 1155 illustrated in FIG. 13. The rotary drive system 1176 includes a motor that operates to rotate the bin handler 1122 beneath the trolley 1170 for 360 degrees about the vertical axis of the bin handler assembly 1180.

While the above-described embodiments refer to a materials exchange level that employs a conveyor system, other embodiments can include a shuttle system at this level. In these embodiments, the horizontal shuttle system is situated below the vertical storage cell columns. According to one embodiment, the horizontal shuttle system includes a horizontal shuttle grid and one or more robotic flatbed shuttles. The shuttle grid is formed of a network of rails or configured in a grid-like arrangement or a plurality of rail tiles that are situated adjacent to one another. The rails include grooves that define a track for the wheels of a robotic flatbed shuttle to traverse. The robotic flatbed shuttles traverse the horizontal shuttle grid to receive and/or deliver storage bins to one of the robotic bin handlers.

The towerbots described above move between locations along the upper level 1077 of the multi-level storage array system 1051 without a load. That is, without carrying a storage bin. However, in alternate embodiments, the towerbots have the headroom necessary to draw a bin within the towerbot frame and then move between locations along the upper level 1077.

Figure 15:
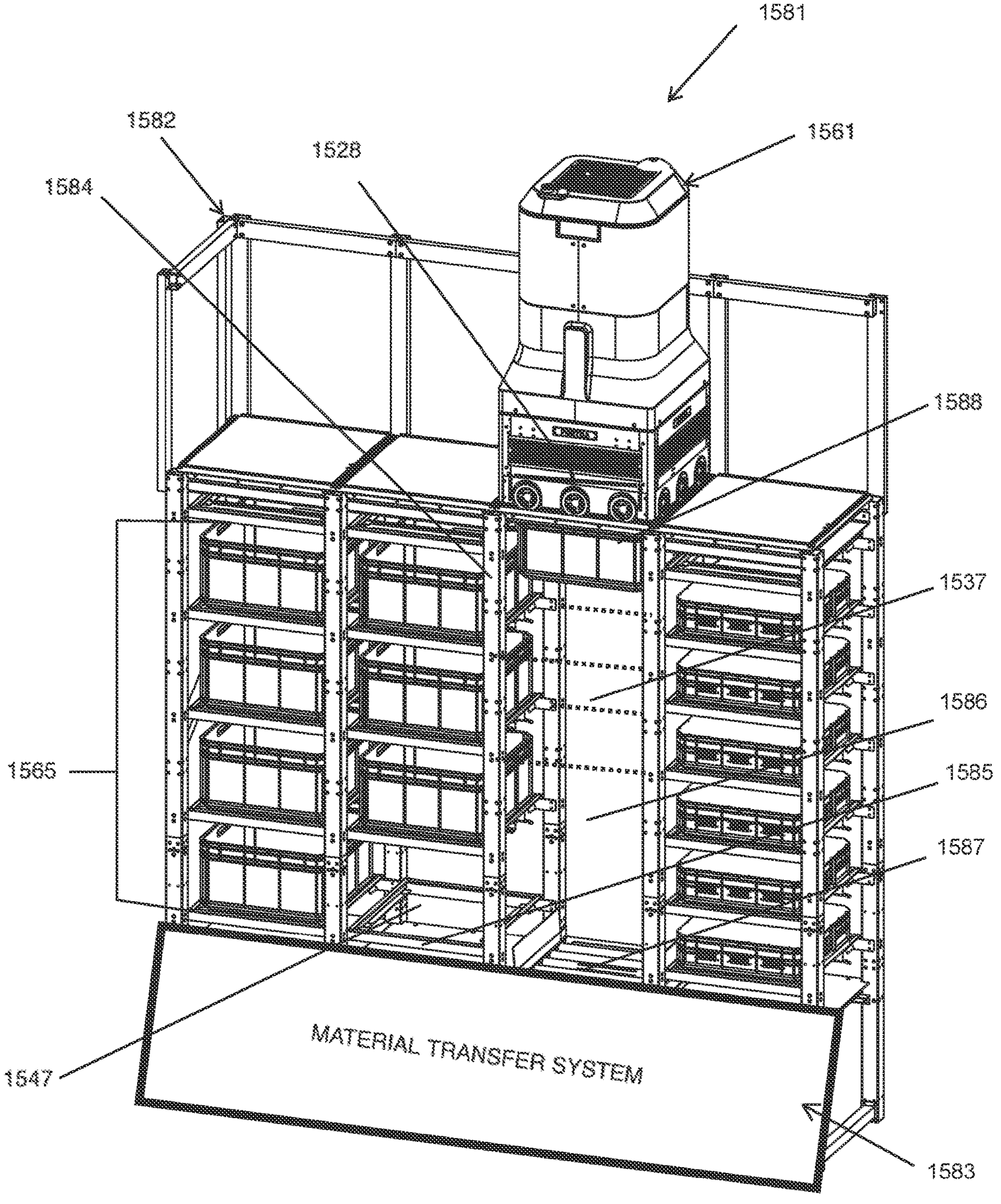
FIG. 15 illustrates a plan view of a logistics hub in accordance with one embodiment.

Referring now to FIG. 15, a plan view of a multi-level storage array system 1581 is illustrated in accordance with some embodiments. In the illustrated embodiment, system 1581 includes a framework 1582, a material transfer system 1583 and a plurality of mobile towerbots, for example, the mobile towerbot 1561. The framework 1582 includes vertical members 1584 and horizontal members 1585 that are fastened to one another to form a three dimensional storage array that includes storage cells 1547 and elevator cells 1537. Here, a single elevator cell defined in the three-dimensional region located between the dashed lines is uniquely identified as the elevator cell 1537. However, the elevator cells 1537 are positioned one above the other to define vertical elevator shafts 1586 within the overall multi-level storage array system 1581. The general outline of one elevator cell 1537 located within the storage array system 1581 is illustrated in phantom for reference. The multi-level storage array system 1581 includes a plurality of storage bins 1565 that are employed for temporary storage of material in the bins 1565 that are accessed via the towerbots. A single storage bin 1588 included in the plurality of storage bins 1565 is secured by the mobile towerbot 1561 in FIG. 15.

In the illustrated embodiment, the material transfer system 1583 is located beneath the cells included in the storage array system 1581. In various embodiments, the material transfer system 1583 includes a transportation system configured to move the storage bins: from drop-off stations to locations beneath the plurality of vertical shafts; and from the locations beneath the plurality of vertical shafts to pickup stations, for storage and retrieval of material within the individual storage bins. The transportation system can also move a storage bin from the location of a first elevator shaft where it is retrieved and dropped off (after being removed from a first storage cell) to a location of a second elevator shaft where it is raised back into the storage array and placed in a different storage cell. For example, where a storage bin includes material that is not being selected for retrieval as frequently as anticipated, the storage bin can be moved to a more out of the way location in the storage array or vice versa.

Depending on the embodiment, the material transfer system 1583 can include one or more conveyor systems or a shuttle system, for example, grid bots. In each approach, the material transfer system 1583 operates to move the storage bins 1565 horizontally beneath the storage array. In some embodiments, the material transfer system 1583 is configured to move storage bins up and down ramps included in the system 1583. According to one embodiment, the material transfer system includes a combination of conveyors systems and shuttle systems. Where a shuttle system is employed it can include a shuttle grid and one or more robotic flatbed shuttles. The shuttle grid can be formed of a network of rails or configured in a grid-like arrangement or a plurality of rail tiles that are situated adjacent to one another. The rails include a track for the wheels of a robotic flatbed shuttle to traverse. Each mobile towerbot 1561 includes the plurality of wheels 1528, for example, located on at least two opposing sides of the towerbot 1561. In one embodiment, the plurality of wheels 1528 are included on all four sides of the towerbot 1561. In further embodiments, the plurality of wheels can be positioned above the lowest portion of the towerbot frame when they are not in use. In various embodiments, during a repositioning of the mobile towerbot 1561 from a first location atop the array of storage cells to a second location atop the array of storage cells, the plurality of wheels 1528 are positioned at an elevation lower than the lowest elevation of the towerbot frame to allow the towerbot frame to clear the framework 1582 when the towerbot is in transit. Each mobile towerbot 1561 also includes a motor operated drive system to provide power to the plurality of wheels 1528 to move the towerbot between different positions atop the storage array. For example, to move the towerbot 1561 from a first position above a first elevator shaft included in the plurality of elevator shafts to a second position above a second elevator shaft included in the plurality of elevator shafts, the first elevator shaft being a different elevator shaft than the second elevator shaft.

According to some embodiments, a lift system (for example, the winch system 1120 illustrated and described with reference to FIG. 11) included in the towerbot 1561, is configured to move a bin handler assembly vertically within the elevator shafts to align the bin handler with a first set of storage cells located adjacent the elevator shaft. With the bin handler positioned adjacent the first set of storage cells, the bin handler is configured to operate to retrieve the storage bin and move the first storage bin vertically within the first elevator shaft, to lower the first storage bin to the transportation system included in the material transfer system 1583 and release the storage bin to the transportation system for a horizontal transport. According to these embodiments, the towerbot 1561 is configured to move atop the storage array from a first position above a first elevator shaft to a second position above a second elevator shaft and then to move the bin handler assembly vertically within the second elevator shaft to align the bin handler with a second set of storage cells located adjacent the second elevator shaft to retrieve a second storage bin and deliver the second storage bin to the transportation system.

As described in greater detail above with reference to the preceding figures, each mobile towerbot 1561 can include a winch system and a bin handler assembly. The bin handler is raised or lowered as needed to access bins adjacent the elevator cell in which the bin handler is operating. Here too, each mobile towerbot 1561 is in communication with a central control system which communicates data including operating instructions to the mobile towerbot 1561. The operating instructions provide the information needed for the mobile towerbot 1561 to coordinate its activities in the multi-level storage array system 1581 to move storage bins 1565 within the storage grid.

According to the illustrated embodiment, the bin handler assembly (see bin handler assembly 1180 illustrated and described with reference to FIG. 14) included in the mobile towerbot 1561 is in the upper most position. That is, the winch system has raised the bin handler assembly as far as possible within the frame of the mobile towerbot 1561. As described elsewhere herein, the bin handler assembly including the trolley and the bin handler are located within the frame of the mobile towerbot 1161, 1561 when raised to the uppermost position. That is, these elements are fully retracted into the towerbot frame (for example, see FIG. 11 and frame 1124). This allows the mobile towerbot 1161, 1561 to relocate between different positions atop the storage array because the frame of the towerbot 1161, 1561 is raised above the upper level (for example, upper level 1077) of the storage array upon which the mobile towerbot 1161, 1561 travels. As illustrated in FIG. 15, the bottom of each wheel included in the plurality of wheels 1528 is lower than the lowest portion of the frame. This acts to raise the frame of the mobile towerbot to provide the clearance necessary for the towerbot to travel atop the storage array.

However, in these embodiments, at least the lower portion of the bin 1588 is positioned beneath the frame and beneath the bottom of each wheel included in the plurality of wheels 1528. Thus, in these embodiments, the mobile towerbot 1561 cannot move laterally atop the storage array when it is in possession of a bin (even with the bin handler assembly in the fully raised position) because the bin 1588 will strike the framework 1582.

Applicants find that the preceding limitation can be addressed for a subset of locations within the multi-level storage array system 1581 by providing "high speed travel lanes." These high speed lanes eliminate some horizontal elements in a set of adjacent cells included at or near the top of the framework 1582 to provide a region for a linear (straight-line travel) between different elevator cells. According to these embodiments, the elimination of selected horizontal elements provides a travel path that does not interfere with travel of a towerbot 1161, 1561 in possession of a bin (for example, the bin 1588). In practice, this approach can be employed for regions of the multi-level storage array system 1581 where the storage cells that see the greatest volume of bin handling or movement are located.

Although bin (or tote) retrieval is illustrated and described above with reference to a bin handler that includes extensions that move into both inner and outer storage cells to retrieve the bins, other approaches can be used according to other embodiments. For example, with a suitable mechanical interface, the bin handler can instead couple to the side of a storage bin adjacent the elevator cell in which the bin handler is located. In one embodiment, a suction attachment is employed. In another embodiment, the bin handler includes hardware to latch onto the near side wall of the bin without the need to extend into the storage cell.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A storage system comprising:

a three dimensional structure including:

an array of cells including: a first plurality of cells configured to retain individual storage bins for retrieval, the array of cells forming a plurality of storage levels located at different elevations within the three dimensional structure, respectively; and a second plurality of cells positioned relative to one another to form a plurality of vertical shafts located within the three dimensional structure, the plurality of vertical shafts configured to permit access to storage cells included in the first plurality of cells at each of the plurality of storage levels; and a material transfer level located beneath the plurality of storage levels, the material transfer level including a transportation system configured to move the individual storage bins: a) from drop-off stations to locations beneath the plurality of vertical shafts; and b) from the locations beneath the plurality of vertical shafts to pickup stations; and a plurality of towerbots located atop the three dimensional structure, each of the plurality of towerbots including a vertical lift system including a bin handler, the plurality of towerbots configured to move the bin handler vertically within the plurality of vertical shafts to align the bin handler with the first plurality of cells at the different elevations, each of the towerbots configured to move laterally atop the three dimensional structure between multiple different locations atop the three dimensional structure including at least a first position located above a first vertical shaft included in the plurality of vertical shafts and a second position located above a second vertical shaft included in the plurality of vertical shafts, wherein, with the towerbot located at the first position, the vertical lift system is configured to position the bin handler in the first vertical shaft adjacent a first set of storage cells at a selected elevation included in the different elevations, the first set of storage cells including at least one inner cell configured to retain an individual storage bin for later retrieval, the at least one inner cell including a first side located immediately adjacent an elevator cell in which the bin handler is positioned at the selected elevation, and a second side located opposite the first side, wherein, with the bin handler positioned adjacent the first set of storage cells, the bin handler is configured to retrieve a first storage bin located in the at least one inner cell for a vertical transport from the selected elevation to the material transfer level for a release of the first storage bin by the bin handler to the transportation system to allow the first storage bin to move from a location beneath the first vertical shaft, wherein the towerbot is configured to move atop the three dimensional structure from the first position to the second position to access the second vertical shaft to retrieve a second storage bin and deliver the second storage bin to the transportation system, wherein the set of storage cells includes at least one set of double deep storage cells including the at least one inner cell and an outer cell, wherein the outer cell included in the at least one set of double deep storage cells is located adjacent the second side of the at least one inner cell, and wherein with the bin handler positioned adjacent the set of storage cells, the bin handler is configured to retrieve, via the at least one inner cell, a storage bin located in the outer cell for the vertical transport from the selected elevation to the material transfer level via the first vertical shaft.

2. The storage system of claim 1, wherein the transportation system includes a conveyor system.

3. The storage system of claim 2, wherein the conveyor system includes a plurality of motorized conveyor tiles.

4. The storage system of claim 1, wherein the drop-off stations and the pickup stations are at the same locations, respectively, as one another.

5. The storage system of claim 1, wherein each of the plurality of towerbots, respectively, is configured to raise and lower an associated bin handler between a fully raised position and a fully lowered position, wherein each of the plurality of towerbots, respectively, includes a plurality of wheels configured to engage the three dimensional structure and propel the respective towerbot between the multiple different locations atop the three dimensional structure, and wherein with the associated bin handler in the fully raised position and a storage bin securely gripped by the associated bin handler a lower portion of the storage bin extends beneath the plurality of wheels of the respective towerbot.

6. The storage system of claim 5, wherein each of the plurality of towerbots, respectively, includes a winch assembly including a plurality of winches each of the plurality of winches including a cable spool including cable coupled to the associated bin handler, and wherein each of the plurality of towerbots, respectively, includes an actuator to automatically raise and lower the winch assembly as the associated bin handler moves between the fully lowered position and the fully raised position to assist in winding the cable around the cable spool.

7. The storage system of claim 1, wherein the transportation system includes a shuttle system configured to move the individual storage bins on the material transfer level.

8. The storage system of claim 7, wherein the shuttle system includes a horizontal shuttle grid and one or more robotic flatbed shuttles configured to traverse the horizontal shuttle grid to receive the individual storage bins from the bin handler.

9. The storage system of claim 1, wherein the three dimensional structure further includes a frame having vertical members that define the plurality of vertical shafts, and wherein the bin handler is included in a bin handler assembly including the bin handler and a trolley, the bin handler coupled to the bin handler assembly beneath the trolley.

10. The storage system of claim 9, wherein the trolley includes a plurality of guide wheel assemblies configured to engage the vertical members of a selected one of the plurality of vertical shafts with the bin handler assembly lowered within the selected one of the plurality of vertical shafts.

11. The storage system of claim 1, wherein the at least one inner cell is one of a plurality of inner cells included in the set of storage cells, wherein the outer cell is one of a plurality of outer cells included in the set of storage cells, and wherein the set of storage cells includes a plurality of sets of double deep storage cells, respectively, each including: a) one of the plurality of inner cells, respectively, each having a respective first side located immediately adjacent the elevator cell in which the bin handler is positioned at the selected elevation and a respective second side located opposite the respective first side; and b) one of the plurality of outer cells, respectively, each located adjacent the respective second side of the respective inner cell included in the respective set of double deep storage cells.

12. The storage system of claim 1, wherein the bin handler includes a base and a plurality of extensions nested together, and wherein the extensions are coupled to at least one motor employed to move the extensions between a retracted position beneath the base and a plurality of extended positions including a first extended position in which the bin handler is positioned to securely grip a first storage bin located in the at least one inner cell and a second extended position in which the bin handler is positioned to extend through the at least one inner cell when empty to reach and securely grip a second storage bin located in the outer cell.

13. A method of material storage and retrieval, the method comprising:

providing a plurality of storage cells arranged together at different elevations within a three dimensional structure, the plurality of storage cells configured to retain individual storage bins for retrieval, the plurality of storage cells includes at least one set of double deep storage cells including at least one inner cell that includes a first side and a second side located opposite the first side, and an outer cell, the outer cell included in the at least one set of double deep storage cells adjacent the first side of the at least one inner cell;

including a plurality of elevator cells positioned relative to one another to form a plurality of vertical shafts located within the three dimensional structure, the plurality of vertical shafts configured to permit access to storage cells included in the plurality of storage cells at each of the different elevations;

locating a material transfer level beneath the plurality of storage cells and the plurality of elevator cells, the material transfer level including a transportation system configured to move the individual storage bins: a) from drop-off stations to locations beneath the plurality of vertical shafts; and b) from the locations beneath the plurality of vertical shafts to pickup stations, for storage and retrieval of material within the individual storage bins;

locating a plurality of towerbots atop the three dimensional structure, each of the plurality of towerbots including a vertical lift system including a bin handler, the plurality of towerbots configured to move the bin handler vertically within the plurality of vertical shafts to align the bin handler with the plurality of storage cells at the different elevations, each of the towerbots configured to move laterally atop the three dimensional structure between multiple different locations atop the three dimensional structure including at least a first position located above a first vertical shaft included in the plurality of vertical shafts and a second position located above a second vertical shaft included in the plurality of vertical shafts;

configuring the bin handler with a range of travel such that when the bin handler is positioned in the first vertical shaft adjacent a first set of storage cells at a selected elevation included in the different elevations, the first set of storage cells including the at least one inner cell and the outer cell, the second side of the inner cell located adjacent the first vertical shaft, with the bin handler positioned adjacent the second side, the bin handler is positioned to retrieve, via the at least one inner cell, a first storage bin located in the outer cell for a vertical transport via the first vertical shaft from the selected elevation to the material transfer level for a release of the first storage bin by the bin handler to the transportation system to allow the first storage bin to move from a location beneath the first vertical shaft; and configuring the towerbot with a drive system to move the towerbot atop the three dimensional structure from the first position to the second position to access the second vertical shaft to retrieve a second storage bin and deliver the second storage bin to the transportation system.

14. The method of material storage and retrieval of claim 13, further comprising:

including a conveyor system in the transportation system, the conveyor system including a plurality of motorized conveyor tiles.

15. The method of material storage and retrieval of claim 13, further comprising:

including a shuttle system configured to move the individual storage bins on the material transfer level in the transportation system, the shuttle system including a plurality of shuttles configured to traverse the horizontal shuttle grid to receive the individual storage bins from the bin handler.

16. A towerbot employed with a storage array including a plurality of elevator shafts located above a transportation system, the towerbot comprising:

a frame;

a lift system secured to the frame;

a bin handler assembly coupled to the vertical lift system, the bin handler assembly including a trolley and a bin handler coupled to the bin handler assembly beneath the trolley;

a set of wheels extending beneath the frame; and a drive system configured to rotate the set of wheels to move the towerbot from a first position above a first elevator shaft included in the plurality of elevator shafts to a second position above a second elevator shaft included in the plurality of elevator shafts, the first elevator shaft being a different elevator shaft than the second elevator shaft, wherein the lift system is configured to move the bin handler assembly vertically within the first elevator shaft to align the bin handler with a first set of storage cells located adjacent the first elevator shaft, wherein, with the bin handler positioned adjacent the first set of storage cells, the bin handler is configured to operate to retrieve a first storage bin and move the first storage bin vertically within the first elevator shaft, to lower the first storage bin to the transportation system and release the first storage bin to the transportation system for a horizontal transport, wherein, the towerbot is configured to move atop the storage array from the first position to the second position and then to move the bin handler assembly vertically within the second elevator shaft to align the bin handler with a second set of storage cells located adjacent the second elevator shaft to retrieve a second storage bin and deliver the second storage bin to the transportation system, wherein the second set of storage cells includes at least one inner cell configured to retain the second storage bin for later retrieval, the at least one inner cell including a first side located immediately adjacent an elevator cell in which the bin handler is positioned when aligned with the second set of storage cells, and a second side located opposite the first side, wherein the second set of storage cells includes at least one set of double deep storage cells including the at least one inner cell and an outer cell, wherein the outer cell included in the at least one set of double deep storage cells is located adjacent the second side of the at least one inner cell, and wherein, with the bin handler positioned adjacent the second set of storage cells, the bin handler is configured to retrieve, via the at least one inner cell, the second storage bin located in the outer cell for the vertical transport to the transportation system via the second elevator shaft.

17. The towerbot of claim 16, wherein, with the bin handler positioned within a selected elevator shaft adjacent a selected set of storage cells located at a selected elevation within the storage array, the bin handler is configured to laterally extend within the storage array to a storage cell included in the selected set of storage cells to retrieve a selected storage bin, to retract and move the selected storage bin into the selected elevator shaft, the selected elevator shaft included in the plurality of elevator shafts, to lower the selected storage bin to the transportation system and release the selected storage bin to the transportation system for a horizontal transport.

18. The towerbot of claim 17, wherein the towerbot includes a vertical axis, and wherein the bin handler includes a rotary drive system coupled to the bin handler, the rotary drive system configured to rotate the bin handler for 360 degrees about the vertical axis beneath the trolley within the plurality of elevator shafts.

* * * * *